United States Patent
Hurri et al.

(10) Patent No.: US 10,503,615 B2
(45) Date of Patent: Dec. 10, 2019

(54) SPIME™ HOST SYSTEM, PROCESS, OBJECT, SELF-DETERMINATION APPARATUS, AND HOST DEVICE

(71) Applicant: BaseN Corporation, Helsinki (FI)

(72) Inventors: Pasi Markus Hurri, Degerby (FI); Erik Jackson Bunn, Basel (CH); Kaj Johannes Niemi, Helsinki (FI)

(73) Assignee: BaseN Corporation, Helsinki (FI)

( * ) Notice: Subject to any disclaimer, the term of this patent is extended or adjusted under 35 U.S.C. 154(b) by 309 days.

(21) Appl. No.: 15/421,330

(22) Filed: Jan. 31, 2017

(65) Prior Publication Data
US 2017/0139788 A1 May 18, 2017

Related U.S. Application Data

(63) Continuation-in-part of application No. 15/073,949, filed on Mar. 18, 2016, now abandoned, which is a
(Continued)

(51) Int. Cl.
*G06F 11/00* (2006.01)
*G06F 11/20* (2006.01)
(Continued)

(52) U.S. Cl.
CPC .......... *G06F 11/203* (2013.01); *G01D 4/002* (2013.01); *G06F 11/1612* (2013.01);
(Continued)

(58) Field of Classification Search
CPC ............... G06F 11/2023; G06F 11/203; G06F 11/2033; G06F 11/2038; G06F 11/2041; G06F 11/2048; G06F 11/2051
See application file for complete search history.

(56) References Cited

U.S. PATENT DOCUMENTS 7,925,923 B1 * 4/2011 Hyser .................. G06F 11/203
714/11
8,108,076 B2 1/2012 Omes et al.
(Continued)

FOREIGN PATENT DOCUMENTS

CN 202634464 Z 12/2012
CN 103945012 A 7/2014

OTHER PUBLICATIONS

Svanfeldt, Olle; Embedded Systems Laboratory, Department of Information Technologies, Åbo Akademi University, 2011.
Barillaud, Franck et al.; IBM cloud technologies: How they all fit together; IBM Technical Library; Jun. 9, 2015.
Fang, Xi et. al.; IEEE.org | IEEE Xplore Digital Library | IEEE-SA | IEEE Spectrum | More Sites; Dec. 9, 2011

*Primary Examiner* — Michael Maskulinski
(74) *Attorney, Agent, or Firm* — Milena Sukovic; Sukovic Law PC

(57) ABSTRACT

A method including executing a portion of a service which is part of at least one service provided by a system including a distributed computing platform; determining object capability parameters required to perform the executing; storing information about at least one target host device; generating an announcement message reporting presence of a service type and the object capability parameters; receiving information from other announcement messages; evaluating current host device capability parameters with respect to the object capability parameters; determining when the current host device capability parameters meet a criterion; initiating a migration request message from the object for migration of the object, the object including software code and processing instructions and service function instructions, the migration to a target object host device, when the module capability parameters meet a criterion; and managing the migration of the object to the target host device.

13 Claims, 14 Drawing Sheets

Related U.S. Application Data continuation of application No. 13/328,952, filed on Dec. 16, 2011, now Pat. No. 9,322,668.

(51) Int. Cl.

| | | |
|---|---|---|
| *G06F 11/16* | (2006.01) | |
| *H04L 12/24* | (2006.01) | |
| *H04L 29/08* | (2006.01) | |
| *G01D 4/00* | (2006.01) | |
| *G06Q 50/06* | (2012.01) | |
| *G06Q 50/10* | (2012.01) | |
| *G06Q 30/02* | (2012.01) | |

(52) U.S. Cl.
CPC ......... *G06F 11/1666* (2013.01); *G06Q 50/06* (2013.01); *H04L 41/0654* (2013.01); *H04L 67/1097* (2013.01); *G06Q 30/0251* (2013.01); *G06Q 50/10* (2013.01); *Y02B 90/241* (2013.01); *Y04S 20/30* (2013.01); *Y04S 20/32* (2013.01)

(56) References Cited

U.S. PATENT DOCUMENTS

| | | | |
|---|---|---|---|
| 8,464,256 B1* | 6/2013 | Havemose | G06F 9/4856 718/1 |
| 8,732,501 B1 | 5/2014 | Ghose et al. | |
| 8,896,461 B2 | 11/2014 | Angelis et al. | |
| 9,008,852 B2 | 4/2015 | Forbes, Jr. | |
| 9,014,996 B2 | 4/2015 | Kamel et al. | |
| 2010/0042673 A1* | 2/2010 | Dayley | G06F 11/2028 709/203 |
| 2011/0282603 A1 | 11/2011 | Milenkovic et al. | |
| 2012/0029720 A1 | 2/2012 | Cherian et al. | |
| 2012/0143943 A1 | 6/2012 | Ko et al. | |
| 2012/0296963 A1 | 11/2012 | Lu et al. | |
| 2012/0297016 A1* | 11/2012 | Iyer | G06F 9/5072 709/217 |
| 2013/0311988 A1* | 11/2013 | Boss | G06F 9/4862 718/1 |
| 2014/0172929 A1 | 6/2014 | Sedayao et al. | |

\* cited by examiner

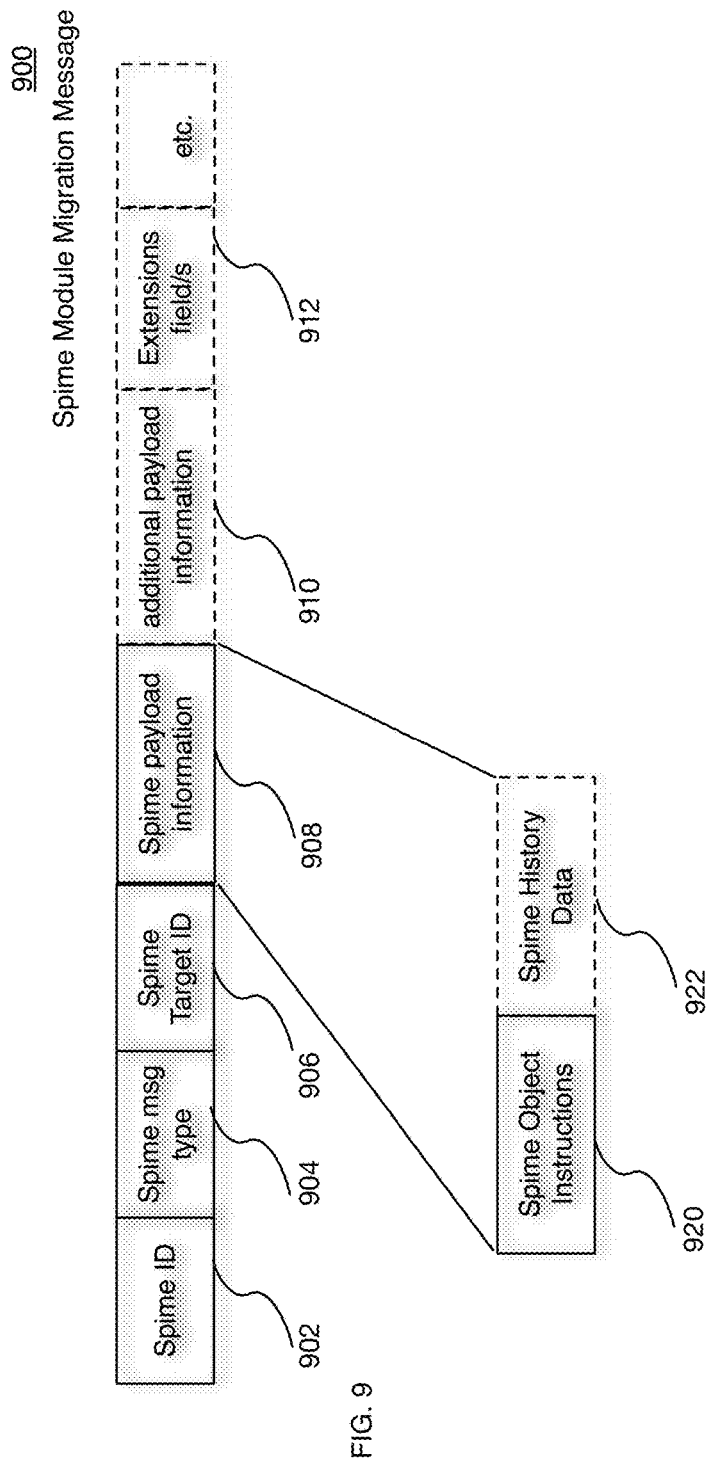
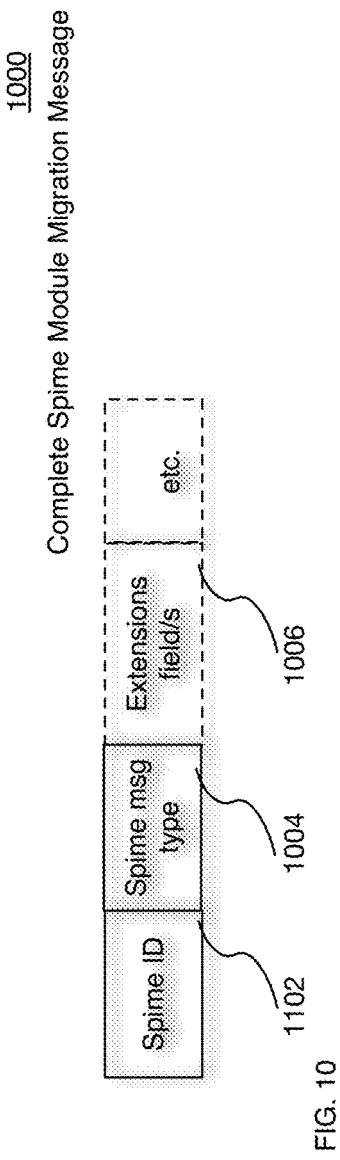
FIG. 9
FIG. 10

SPIME™ HOST SYSTEM, PROCESS, OBJECT, SELF-DETERMINATION APPARATUS, AND HOST DEVICE

RELATED APPLICATIONS

This application is a continuation-in-part application of, and claims priority to, continuation application Ser. No. 15/073,949 filed on Mar. 18, 2016; which is a continuation application of, and claims priority to, the following patent application, filed on Dec. 16, 2011; the contents of each of which are incorporated herein by reference in their entireties:

U.S. patent application Ser. No. 13/328,952 titled SMARTGRID ENERGY-USAGE-DATA STORAGE AND PRESENTATION SYSTEMS, DEVICES, PROTOCOL, AND PROCESSES, which incorporated therein in their entirety the following co-filed and cross-referenced related patent applications:

U.S. patent application Ser. No. 13/328,963 titled SMARTGRID ENERGY-USAGE-DATA STORAGE AND PRESENTATION SYSTEMS, DEVICES, PROTOCOL, AND PROCESSES INCLUDING A STORAGE DISTRIBUTION PROCESS;

U.S. patent application Ser. No. 13/328,968 titled SMARTGRID ENERGY-USAGE-DATA STORAGE AND PRESENTATION SYSTEMS, DEVICES, PROTOCOL, AND PROCESSES INCLUDING A STORAGE DISTRIBUTION PROCESS AND PROTOCOL;

U.S. patent application Ser. No. 13/328,972 titled SMARTGRID ENERGY-USAGE-DATA STORAGE AND PRESENTATION SYSTEMS, DEVICES, PROTOCOL, AND PROCESSES INCLUDING AN ANNOUNCEMENT PROTOCOL;

U.S. patent application Ser. No. 13/328,979 titled SMARTGRID ENERGY-USAGE-DATA STORAGE AND PRESENTATION SYSTEMS, DEVICES, PROTOCOL, AND PROCESSES INCLUDING A VISUALIZATION, AND LOAD FINGERPRINTING PROCESS.

The above-identified patent applications are assigned to the same entity and are incorporated herein by reference in their entirety.

FIELD OF DISCLOSURE

The present disclosure relates generally to a Spime™ host system, process, object, module, and host device, and more particularly to a Spime™ object and self-determination apparatus, which evaluates capability parameters and determines when a Spime™ object is to migrate to another host device to maintain optimal operation of the Spime™ module in a host system.

BACKGROUND

Conventional data storage systems and conventional service providing systems use distributed computing platforms to store data or host user services. Such systems are file storage systems, remote monitoring systems, remote control systems, etc. In order to maintain continuous operations, providers of these systems use conventional failure tolerance mechanisms.

Some system failures are planned and others are unplanned. Unplanned failures include hardware failure, power outages, software bugs, user error, or other individual resource or network problems. To correct for unplanned system failures, some providers designed their systems to have fault tolerance mechanisms. Conventional fault tolerance mechanisms require human intervention with some automated redundant device techniques.

For unplanned system faults, conventional automatic redundant techniques include information redundancy, which uses error correction codes. Other conventional automatic redundant techniques include time redundancy by performing a faulty operation several times, such as retransmission. Other techniques include physical device redundancy, whereby one device is active and another is standby to take over when the active device fails. Other techniques include replication where several units operate concurrently and use a voting system to select the outcome. Typically, the more fault tolerance built into the system the more costly the system is.

An example of a planned system fault is when a resource in a system requires improvement via maintenance or an upgrade. Conventional systems can be improved when a human physically disconnects the old resource and configures the software of the improved resource and physically integrates the improved resource. This conventional technique causes system down time.

Providers of conventional systems are under pressure to reduce downtime and maintain seamless operation during planned and unplanned system failures. To evaluate different failure tolerance mechanisms, providers have developed a measurement, termed system "availability," to describe a desired or achieved level of fault tolerance, which results in continued system access for their users. Availability refers to the amount of time a system is functioning without interruption. The fraction of time the system is available may be expressed as a percentage. A system available an entire year with a maximum of 5.26 minutes of downtime is said to be highly fault tolerant or to have 99.999% availability. Telephone systems have the goal of achieving this level of tolerance. Other systems, such as an energy monitoring system may experience 44-87 hours of downtime for a year, which amounts to a 99-99.5% availability.

On top of operating demands, complexity of storage and service host systems has grown with the advent of the need for increased data storage, delivery, analysis, transformation, and presentation. In addition, commercial and customer data and software service providers have moved storage and hosting functionality from local to remote locations. Some rely on global networks to host their storage or service capabilities. Providers find themselves using larger and more complicated systems, which have more difficult problems in maintaining system availability.

There is a need for improved system availability in data storage and service providing systems.

SUMMARY

A Spime™ self-determination apparatus including an object including instructions to execute a portion of a service which is part of at least one service provided by a system including a distributed computing platform, instructions to determine its own Spime™ object capability parameters, and instructions to store information about at least one target Spime™ host device; a Spime™ announcement module to generate an announcement message reporting presence of a Spime™ service type and the Spime™ object capability parameters; a Spime™ host evaluator module: to receive information from other Spime™ announcement messages, to evaluate current host device capability parameters with respect to the Spime™ object capability parameters or target capability parameters, to determine when the current host device capability parameters meet a criterion, and to initiate a migration request message from the Spime™ object for migration of the Spime™ object, the object including software code and processing instructions and service function instructions, the migration to a target Spime™ object host device, when the module capability parameters meet a criterion; and a Spime™ migration module to manage the migration of the Spime™ object to the target Spime™ host device.

A Spime™ self-determination apparatus including an object including instructions to execute a portion of a service which is part of at least one service provided by a system including a distributed computing platform, instructions to determine its own Spime™ object capability parameters, and instructions to store information about at least one target Spime™ host device; a Spime™ announcement module to generate an announcement message reporting presence of a Spime™ service type and the Spime™ object capability parameters; a Spime™ host evaluator module: to receive information from other Spime™ announcement messages, to evaluate current host device capability parameters with respect to the Spime™ object capability parameters and target host device capability parameters, to determine when the current host device capability parameters meet a criterion, and to initiate a migration request message from the Spime™ object for migration of the Spime™ object, the object including software code and processing instructions and service function instructions, the migration to a target Spime™ object host device, when the module capability parameters meet a criterion; and a Spime™ migration module 216 to manage the migration of the Spime™ object to the target Spime™ host device.

A system including a distributed computing platform including a plurality of Spime™ host devices, wherein each Spime™ host device of the plurality includes: a Spime™ self-determination apparatus including: a Spime™ object including Spime™ object software including instructions to execute a portion of a service which is part of at least one service provided by a system designed to run on a distributed computing platform, instructions to determine its own Spime™ object capability parameters, and instructions to store information about at least one target Spime™ host device; a Spime™ announcement module to generate an announcement message reporting presence of a Spime™ service type and the Spime™ object capability parameters of the Spime™ self-determination apparatus; a Spime™ host evaluator module: to receive information from other Spime™ announcement messages, to evaluate current host device capability parameters with respect to the Spime™ object capability parameters or target capability parameters or both the Spime™ object capability parameters and the target capability parameters, to determine when the current host device capability parameters meet a criterion, and to initiate a migration request message from the Spime™ object for migration of the Spime object, the object including software code and processing instructions and service function instructions, the migration to a target Spime object host device, when the module capability parameters meet a criterion; a Spime™ migration module to manage the migration of the Spime™ object to the target Spime™ host device; and the system further comprising: a Spime™ available agent host device; a second Spime™ host device determined to include the target Spime™ object host device.

A process including determining whether current capability parameters of a Spime™ object stored at a first host device have increased responsibilities for storage; updating current capability parameters of the Spime™ object to reflect the increase; determining whether the current capability parameters approach the limits of the storage used to store the Spime™ object; determining whether a suitable target host device exists; initiating a migration process for the Spime™ object from the first host device to a suitable target host device, when it was determined the suitable target host device existed.

A process including determining current capability parameters of a Spime™ object; generating an announcement message including the current capability parameters; receiving potential target host messages from potential target hosts; checking whether a criterion of the Spime™ object is met by information found in the received target host messages; determining whether criterion for initiating a migration process is met; initiating the migration process to migrate the Spime™ object to one of the potential target hosts.

A Spime™ system including a distributed computing platform including a plurality of Spime™ host devices, wherein at least one Spime™ host device includes: a Spime™ self-determination apparatus including: a Spime™ object including instructions to execute a portion of a manufactured-product-tracking service method and instructions to establish and maintain a user account with a manufacturer, instructions to determine its own function capability parameters (e.g., current price of item); instructions for communicating outside the host device, using local resources allocated to it by a host resource manager object of the host device; a Spime™ announcement module to generate an announcement message reporting presence of a Spime™ service type (e.g., indicating it performs at least a part of a manufactured product tracking service method or any other method of a service described herein or known to one of ordinary skill in the art at the time of the invention having the benefit of the description herein, offered as a service executed by a distributed computing platform) and the Spime™ object capability parameters (e.g., current price of item); a Spime™ function evaluator module: to receive information from another Spime™ announcement message, to evaluate current function capability parameters (e.g., current price from current associated user-manufacturer account) with received capability parameters, to determine when the current capability parameters meet a criterion (e.g., initiate price search when current manufacturer price exceeds limit), and to initiate generation of a migration request message when the criterion is met, the migration request message initiating migration of stored instructions from an originator Spime™ object and its host device to the target Spime™ object and its host device, the stored instructions to be migrated include instructions to manage a client account, the instructions to manage the client account being in accordance with the manufactured-product tracking service instructions; a Spime™ migration module to manage the migration of the instructions to manage the client account from the originator Spime™ object host device to the target Spime™ object host device, along with its own local resource manager object including instructions for communicating outside its new host device using its new local host resources of the target host in accordance with a host resource manager of the target host device.

A Spime™ system including a distributed computing platform including a plurality of Spime™ host devices, wherein at least one Spime™ host device of the plurality includes: a Spime™ self-determination apparatus including: a Spime™ object including instructions to manage private client information and instructions to provide access to the private client information, instructions to determine its own Spime™ object capability parameters including privacy settings indicating which entity is allowed access to the private client information; a Spime™ announcement module to generate an announcement message reporting presence of a Spime™ service type and the Spime™ object capability parameters of the Spime™ self-determination apparatus; a Spime™ host evaluator module: to receive information from a target Spime™ announcement message, to evaluate current capability parameters (e.g., current privacy settings), to determine when target capability parameters meet a criterion (e.g., access to private client information), and to initiate generation of a migration request message when the criterion is met, the migration request message initiating migration of a copy of stored data or stored instructions from the Spime™ object and its host device to a target Spime™ object and its associated target host device, the stored instructions including instructions for accessing private client information; a Spime™ migration module to manage the migration of stored data and stored instructions from the Spime™ object to the target Spime™ object.

A Spime™ system including a distributed computing platform including a plurality of Spime™ host devices, wherein at least one Spime™ host device of the plurality includes: a Spime™ self-determination apparatus including: a Spime™ object including instructions to manage private client information and instructions to provide access to the private client information, instructions to determine its own Spime™ object capability parameters including privacy requirements; a Spime™ announcement module to generate an announcement message reporting presence of a Spime™ service type (e.g., privacy manager) and the Spime™ object capability parameters of the Spime™ self-determination apparatus; a Spime™ host evaluator module: to receive information from a target Spime™ announcement message, to evaluate current capability parameters (e.g., current privacy settings), to determine when target capability parameters meet a criterion (e.g., jurisdiction with privacy rights in accordance with privacy requirements), and to initiate generation of a migration request message when the criterion is met, the migration request message initiating migration of the Spime™ object to a target Spime™ object and its associated target host device; a Spime™ migration module to manage the migration of stored data and stored instructions from the Spime™ host device to the target Spime™ host device.

A Spime™ system including a distributed computing platform including a plurality of Spime™ host devices, wherein at least one Spime™ host device includes: a Spime™ self-determination apparatus including: a Spime™ object including instructions to establish and manage a customer energy account, instructions to determine its own Spime™ object capability parameters (e.g., current price of energy); a Spime™ announcement module to generate an announcement message reporting presence of a Spime™ service type (e.g., energy manager) and the Spime™ object capability parameters (e.g., current price of energy); a Spime™ host evaluator module: to receive information from another Spime™ announcement message, to evaluate current capability parameters (e.g., current import energy price) and target capability parameters (e.g., offered export energy price), to determine when the current and received capability parameters meet a criterion (e.g., current import price obtained is greater than offered export energy cost), and to initiate generation of a migration request message when the criterion is met, the migration request message initiating migration of stored instructions from an originator Spime™ object and its host device to the target Spime™ object and its associated target host device, the stored instructions including instructions for maintaining a client energy account; a Spime™ migration module to manage the migration of the instructions from the originator Spime™ object to the target Spime™ object.

A Spime™ system including a distributed computing platform including a plurality of Spime™ host devices, wherein at least one Spime™ host device includes: a Spime™ self-determination apparatus including: a Spime™ object including instructions to manage security of a customer account, instructions to determine its own Spime™ object capability parameters (e.g., current security level provided by host resources); a Spime™ announcement module to generate an announcement message reporting presence of a Spime™ service type (e.g., security manager) and the Spime™ object capability parameters (e.g., current security level); a Spime™ host evaluator module: to receive information from another Spime™ announcement message, to evaluate current capability parameters (e.g., current security level) and target capability parameters (e.g., offered security level), to determine when the current and received capability parameters meet a criterion (e.g., better security level exists), and to initiate generation of a migration request message when the criterion is met, the migration request message initiating migration of stored instructions from an originator Spime™ object and its host device to the target Spime™ object and its associated target host device; a Spime™ migration module to manage the migration of the stored instructions from the originator Spime™ host device to the target Spime™ host device.

A Spime™ self-determination apparatus including a Spime™ object including instructions to execute a portion of a method for providing a service which is part of at least one service provided by a system including a distributed computing platform, instructions to determine its own Spime™ object capability parameters, and instructions to store information about at least one target Spime™ host device; a Spime™ announcement module to generate an announcement message reporting presence of a Spime™ service type and the Spime™ object capability parameters required by the Spime™ object; a Spime™ host evaluator module: to receive information from other Spime™ announcement messages, to evaluate current capability parameters, to determine when the current capability parameters meet a criterion, and to initiate a migration request message from the Spime™ object for migration of the Spime™ object to or from another Spime™ object, the migrating object including software code and processing instructions and service function instructions, when the current or received capability parameters meet a criterion; a Spime™ migration module to manage the migration of the Spime™; and a Spime™ local resource manager object to keep track of local resources available to the Spime™ self-determination apparatus.

A Spime™ host device including a Spime™ self-determination apparatus and further including a processor, a memory, a network interface module, and a host resource manager object, the host resource manager object to keep track of available local resources and non-local resources, to communicate information regarding available resources to a Spime™ local resource manager object. The Spime™ host resource manager object to communicate information regarding available resources to the Spime™ local resource manager object when migration of a migrated Spime™ service object occurred to the Spime™ self-determination apparatus. The Spime™ local resource manager object to communicate information regarding required resources to the Spime™ host resource manager object when migration of a migrated Spime™ service object occurred to the Spime™ host device. The host device including resources of computing devices known to a person having ordinary skill in the art at the time of the invention having the benefit of the description herein. Local resources and non-local resources including local as determined by architecture of the distributed computing platform or other system architecture. Local resources and non-local resources including local as determined as being local to the Spime™ object requirements or current capability parameters and non-local as being associated with the host device, e.g., current host device or target host device or potential host device or available agent device or production apparatus.

A Spime™ system including a distributed computing platform including a plurality of Spime™ host devices, wherein at least one Spime™ host device includes: a Spime™ self-determination apparatus including: a Spime™ object including instructions to manage delivery of a product for a group of customers, instructions to determine its own Spime™ object capability parameters (e.g., current delivery price per unit); a Spime™ announcement module to generate an announcement message reporting presence of a Spime™ service type (e.g., delivery manager) and the Spime™ object capability parameters (e.g., current delivery price per unit); Spime™ host evaluator module: to receive information from another Spime™ announcement message, to evaluate current capability parameters (e.g., current price per unit delivery) and target capability parameters (e.g., delivery price offered), to determine when the current and received capability parameters meet a criterion (e.g., better delivery price exists), and to initiate generation of a migration request message when the criterion is met, the migration request message initiating migration of an instance of an originator Spime™ object from its host device to the Spime™ object and its associated target host device; a Spime™ migration module to manage the migration of the instance from the originator Spime™ host device to the target Spime™ host device.

A process including determining current capability parameters of a Spime™ object; generating an announcement message including the current capability parameters; receiving responding object message; checking whether a criterion of the Spime™ object is met by information found in the received responding object message; determining whether criterion for initiating an object migration process is met; initiating the migration process to migrate the responding object to be stored with the Spime™ object.

A Spime™ system including a distributed computing platform including a plurality of Spime™ host devices, wherein at least one Spime™ host device includes: a Spime™ self-determination apparatus including: a Spime™ object including instructions to assist in managing a flight path, instructions to determine its own Spime™ object capability parameters (e.g., communication speed and geographical direction); a Spime™ announcement module to generate an announcement message reporting presence of a Spime™ service type (e.g., flight path assistant manager) and the Spime™ object capability parameters (e.g., guaranteed continuous minimum communication speed at direction); a Spime™ host evaluator module: to receive information from a plurality of another Spime™ announcement message, to evaluate a plurality of received current capability parameters (e.g., current communication throughput and direction), to determine which of the received capability parameters best meets a criterion (e.g., best received communications throughput), and to initiate generation of a migration request message 800 when the criterion is met, the migration request message initiating migration of stored instructions from the Spime™ object and its host device to a target Spime™ object associated with the determined capability parameters which best met the criterion, and its associated target host device; a Spime™ migration module to manage the migration of the stored instructions from the Spime™ host device to the target Spime™ host device.

Also disclosed herein is any process i.e., method, described herein including the physical architecture described herein or regardless of the physical architecture described herein. In an embodiment, any method described herein in accordance with the physical architecture described herein is disclosed and understood to include any computing device architecture or physical component, as would be understood by a person having ordinary skill in the art at the time of the invention having the benefit of the description herein. An example of a computing device embodiment available to a person having ordinary skill in the art at the time of the invention is public U.S. Pat. No. 8,515,829, incorporated herein by reference.

Also described herein is one or more storage devices storing instructions that are executable to perform operations of any method described herein, as would be understood by a person having ordinary skill in the art at the time of the invention having the benefit of the description herein.

BRIEF DESCRIPTION OF THE DRAWINGS

The accompanying figures, where like reference numerals refer to identical or functionally similar elements throughout the separate views, together with the detailed description below, are incorporated in and form part of the specification, and serve to further illustrate embodiments of concepts that include the claimed embodiments, and explain various principles and advantages of some of those embodiments.

FIG. 9 illustrates an exemplary Spime™ module migration message in accordance with an embodiment of the present disclosure.

FIG. 10 illustrates an exemplary complete Spime™ module migration message in accordance with an embodiment of the present disclosure.

Figure 1:
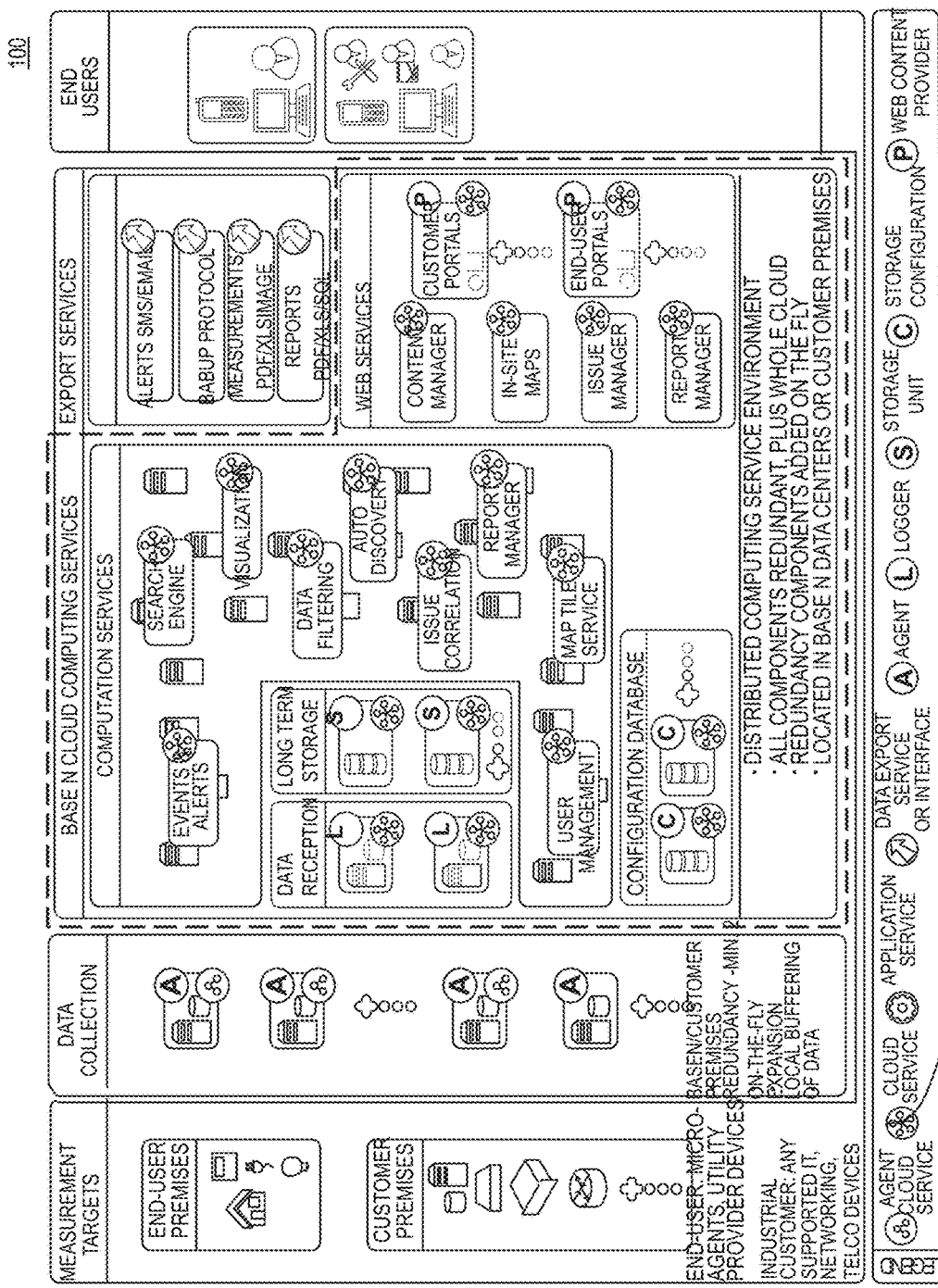
FIG. 1 is a block diagram of example architecture of a Spime™ host system including a plurality of different types of embodiments of Spime™ self-determination apparatus in accordance with an embodiment of the present disclosure.

The apparatus and method components have been represented where appropriate by conventional symbols in the drawings, showing only those specific details that are pertinent to understanding the embodiments of the disclosure herein so as not to obscure the disclosure with details that will be readily apparent to those of ordinary skill in the art having the benefit of the description herein.

DETAILED DESCRIPTION

As stated above, there is a need for improved system availability of data storage and service providing systems. Some embodiments of the invention described herein provide for improved system availability to handle fault tolerance, upgrades, or maintenance. Described herein are embodiments of: a Spime™ object, Spime™ self-determination apparatus, Spime™ host device, Spime™ processes including protocol messages, and a Spime™ host system.

An example architecture embodiment of a Spime™ host system can include one or more of a Spime™ self-determination apparatus or different types of Spime™ self-determination apparatuses. An example architecture embodiment is described in U.S. Pat. No. 9,322,668 in FIG. 7, which is reprinted herein as FIG. 1, including a different identifier for description purposes. FIG. 1 illustrates an example system, which can include a Spime™ host system 100 including at least one Spime™ self-determination apparatus. A Spime™ self-determination apparatus can be one of a service module of a plurality of different types of service modules, each of which are indicated with identifier 102. In the embodiment, each of the service modules depicted with the identifier 102 are part of the BaseN™ cloud computing system. In an embodiment, a Spime™ self-determination apparatus 102 is capable of communicating all or a part of the service announcement protocol described in U.S. Pat. No. 9,322,668. Spime™ self-determination apparatus 102 is also capable of executing a Spime™ protocol or portion thereof including a procedure generating an embodiment of a Spime™ protocol message described herein.

Before providing more detailed description, Spime™ is a term first used and described by fiction writer Bruce Sterling in his speeches and his book "Shaping Things" to mean an "object precisely localized in time and space [ . . . ] always associated with a history." Bruce Sterling conceptualized a Spime™ object to be trackable through space and time throughout its lifetime. BaseN™ developed an invention that moved the Spime™ concept from imagination to reality.

BaseN™ has built embodiments, which provide functionalities, described herein, inspired by Sterling's Spime™ concept. The invention described herein provides a physical manifestation of a Spime™ concept along with the capability to provide increased seamless system operation or improved availability using embodiments of a Spime™ host system, Spime™ processes and protocol messages, Spime™ objects, self-determination apparatus, and host devices. In an embodiment, hosting a Spime™ object on a Spime™ host device includes solving a complex problem of scaling or improving the system while maintaining the information of the Spime™ object in the Spime™ module throughout its lifetime, while reducing system downtime. In an embodiment, hosting a Spime™ object on a Spime™ host device in a Spime™ host system includes maintaining access to historical information of the Spime™ object for its full life-cycle in a Spime™ self-determination apparatus.

FIG. 1 illustrates an example architecture embodiment, which can include a Spime™ host System 100. The system can include a distributed computing platform. System 100 can include a plurality of host devices including at least one self-determination apparatus. A Spime™ self-determination apparatus 102 includes the example embodiment of a software or hardware or software and hardware combination module e.g., a smart programmable device. Module 102 can perform any one of: agent service, logger service, storage unit, event monitoring and alerting, search engine, visualization, data filtering, autodiscovery, inventory, issue correlation, report manager, user management, map tile service, content manager, insite map, issue manager, report manager, customer portal, end-user portal, data export service, or interface service, or any combination of the described services, as described in U.S. Pat. No. 9,322,668 incorporated herein in its entirety, or other service described herein or available to a person having ordinary skill in the art at the time of the invention with the benefit of the present disclosure. Any one of these particular service modules includes specified instructions and procedures for performing at least a part of a method for the respective service. The particular specified instructions are an example embodiment of Spime™ object. In the example architecture illustrated in FIG. 1, the different service modules can be examples of different embodiments of a Spime™ self-determination apparatus.

Figure 2:
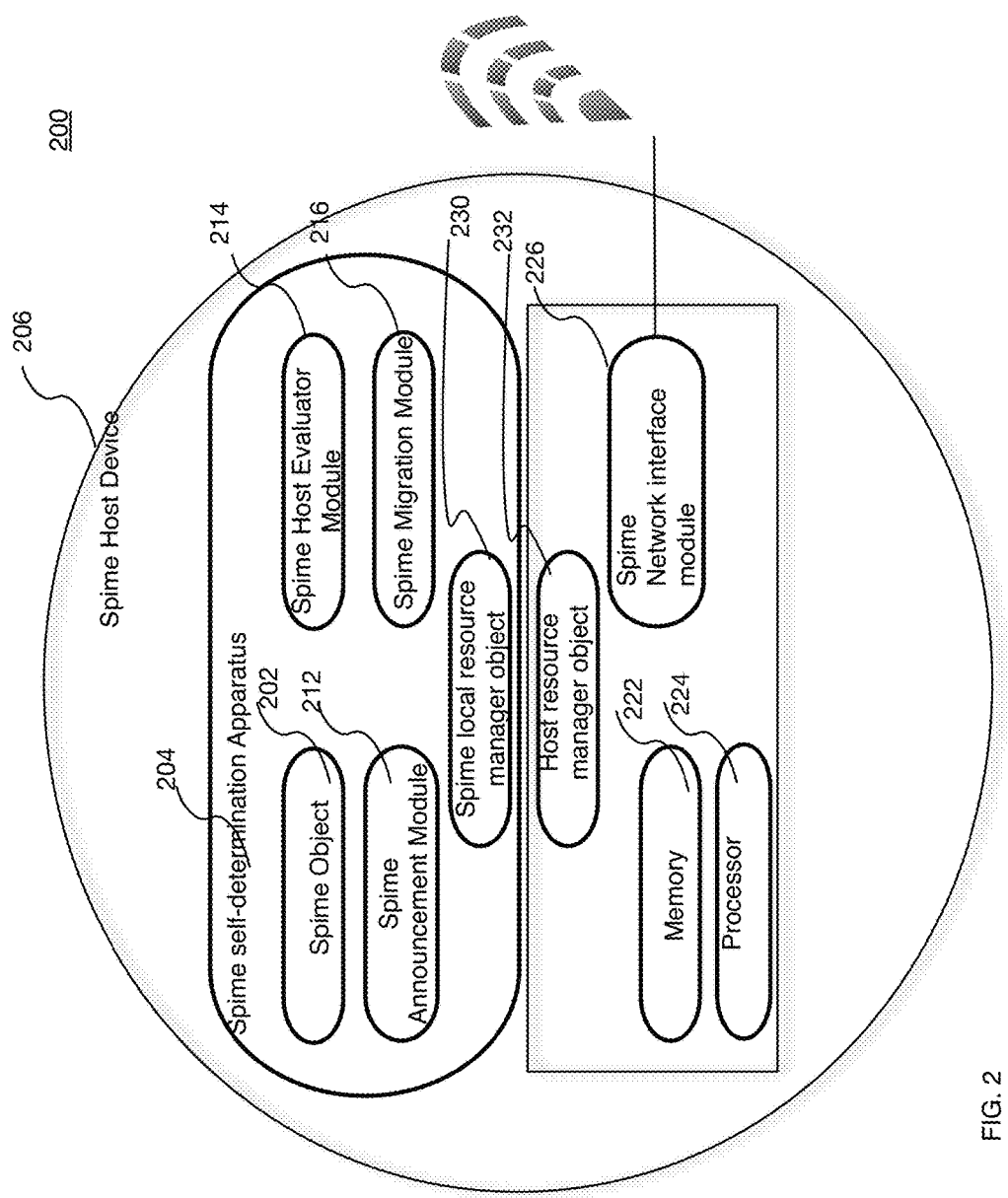
FIG. 2 is a block diagram of example architecture of a Spime™ host device including a Spime™ self-determination apparatus in accordance with an embodiment of the present disclosure.

FIG. 2 illustrates an embodiment of a Spime™ host device 206, and Spime™ self-determination apparatus 204, and Spime™ object 202. In particular, a Spime™ object 202 includes a specific set of instructions for at least a part of a method to perform a particular service in a Spime™ host system, e.g., system 100. Spime™ object 202 can include bi-directional communication and control instructions to communicate with another Spime™ object or host device or to communicate to logical or physical components internal to its current Spime™ self-determination apparatus 204 or its current Spime™ host device 206. Object 202 can include a local resource manager object 230 including instructions for communicating with logical or physical components within its host device or outside its host device or both.

In the embodiment illustrated in FIG. 2, local resource manager object 230 can be stored as part of object 202, or outside object 202 and within the self-determination apparatus 204. Local resource management object 230 can include instructions to help object 202 determine its own Spime™ object current capability parameters. Spime™ object 202 can include local resource manager object 230 instructions. The local resource manager object 230 instructions can include instructions to retrieve logical current capability parameters, which the Spime™ object 202 receives for some of its functioning. For example, the instructions can include instructions to send a message on any coupling or connection, e.g., a communication bus. The logical-current-capability-parameters-request message can be sent to each local module (e.g., local includes sharing part of memory allocation of the Spime™ self-determination apparatus 204) with local communications with the Spime™ object 202. When the logical-current-capability-parameters-request message is received by a module in local communication with the Spime™ object 202, the module sends the requested information. The received logical current capability parameters information is stored within the Spime™ object 202.

For example, when prompted: Spime™ announcement module 212 sends current capability parameters indicating the functionality it provides to Spime™ object 202; Spime™ evaluator module 214 does the respective same, as do any remaining modules sharing local storage with the Spime™ object 202 (as allocated by the Spime™ self-determination apparatus 204). For example, when prompted by Spime™ object 202, local resource manager object 230 will provide its logical current capability parameters.

In an embodiment, local resource manager object 230 can include instructions to prompt the current Spime™ host device 206 components so that it may keep track of and store what components make up the Spime™ host device 206. Each component of the Spime™ host device 206 includes instructions to respond to a prompt (e.g., a physical-current-capability-parameter-request message) with information regarding its functionality including its current capability parameters. Note, the term current capability parameters includes the non-plural case when there is only one current capability parameter.

For example, information regarding its functionality includes what physical current capability parameters or both logical current capability parameters and physical current capability parameters a component provides to Spime™ object 202. Physical current capability parameters can include design specification information, usage information, or other current capability parameters listed herein, or any combination thereof.

In an embodiment illustrated in FIG. 2, local resource manager object 230 can include instructions to communicate with a Spime™ host resource manager object 232. Host resource manager object 232 can coordinate information associated with execution capabilities of the local host device 206 or with execution capabilities of a higher architecture level software or hardware or both of a local system architecture including the host device 206.

In an embodiment illustrated in FIG. 2, the above prompting and storage of physical current capability parameters or the above prompting and storage of both logical current capability parameters and physical current capability parameters, from each component of the Spime™ host device 206 can be performed by a Spime™ host resource manager object 232 so that the Spime™ self determination apparatus 204 is free to only provide the functionality of prompting and storing only logical current capability parameters of the Spime™ self determination apparatus 204.

Depending upon the component type, when a local component of the Spime™ host device 206 receives a prompt, it sends its physical current capability parameters or sends both logical current capability parameters and physical current capability parameters. Each component of a Spime™ host device 206 includes memory including its stored current capability parameter information. Example components include a component illustrated in FIG. 2 and FIG. 14 herein, and also include any component known to one of ordinary skill in the art at the time of the invention having the benefit of the disclosure herein.

The host device Spime™ object 202 can include any one or more of data input and output interface instructions, algorithms, procedures, or functionality. Spime™ object 202 can include software that is adaptable to one or more different hardware hosts. Spime™ object 202 can include data associated with an inception of an object to its current state, and all of any in between history data including one or more states. Spime™ object 202 can include data associated with a continuous feed of usage, performance, and fault data. Spime™ object 202 can include data associated with customer support and research and development. Spime™ object 202 can include data associated with a physical object and some or all data associated with it so that the physical object can transform into Spime™ object 202 of a service model. For example, a service model can include a business transaction wherein a represented physical object is replaceable or disposable.

In an embodiment, the set of instructions of the Spime™ object 202 can include instructions to execute a portion of a method for a service in a distributed computing platform. In an embodiment, a distributed computing platform includes multiple computer modules working on a single problem. For example, a single problem is divided into many parts, and each part is solved by different computer modules. As long as the computer modules are networked, they can communicate with each other to solve the problem.

In an embodiment, a distributed computing platform includes a number of client servicing modules including Spime™ host devices and sensor agents. A client-servicing module detects when the host device is idle or has excess capability parameters and sends a notification to another Spime™ host device. The notification indicates that the module is not in use or available for a processing job.

A goal of an example distributed computing platform using a Spime™ object embodiment included herein is to maximize performance by connecting users or maintaining services using information technology resources in a more cost-effective, transparent, resilient, or reliable manner. For example, some embodiments described herein can improve fault tolerance and resource availability in the event that one of its modules fails. For example, some embodiments described herein enable a distributed computing platform system to seamlessly scale with new resources or have legacy resources removed or upgraded. In an embodiment, a distributed computing platform includes hardware architecture, an operating system (OS), procedures, and runtime libraries.

The services provided by an embodiment of a Spime™ system can be related to maintaining or tracking a physical object or can be related to providing a service, e.g. a service distributed over a closed or open network, such as the Internet. In an embodiment, a Spime™ object 202 can include instructions for at least a part of a method for a communications service, instructions for at least a part of a method for a service provided to a user or client by a smart phone device. In an embodiment, a Spime™ object 202 can include instructions for at least a part of a method for a maintenance or preventative maintenance service associated with a physical object. Spime™ object can include instructions for a broad range of instructions for at least a part of a method for a service. In an embodiment, a Spime™ object 202 can include instructions for at least a part of a method for a lifting service, e.g., service associated with a fork lift or crane. In an embodiment, a Spime™ object 202 can include instructions for at least a part of a method for a service control capability for an electric device, such as a light bulb, physical package delivery device, flying machines, etc. A Spime™ object can include instructions for at least a part of a method to perform many kinds of services, ranging from a physical control service or sensing service e.g., from industrial automation and machinery, autonomous and semi-autonomous vehicles, home automation; to home automation type applications; to a purely virtual service, e.g. a consumer phone application service.

A Spime™ object 202 can consist entirely of stored software instructions. A Spime™ object 202 includes information about current capability parameters it requires in determining whether a host device is capable of hosting its service providing instructions. In an embodiment, a Spime™ object 202 can include information about one or more capability parameters it requires in determining which Spime™ host device can be used to execute its instructions sufficiently. For example, a long-term storage service Spime™ object in a long-term storage service self-determination apparatus of U.S. Pat. No. 9,322,668 can require a host device with at least a memory requirement, e.g., 16 megabytes of addressable memory and pointers. In another example, a logger service Spime™ object in a data reception logger service self-determination apparatus of U.S. Pat. No. 9,322,668 can require a host device with at least a minimum bandwidth, e.g., a minimum 10 Gigabit per second bandwidth. In an embodiment, capability parameters required to host a Spime™ object adapt to changes of the Spime™ object. For example, if a Spime™ object requiring 16 gigabytes of memory is hosted in a host with 32 gigabytes of memory, the available 16 gigabytes of memory are adjusted to the host's capability parameters to reflect the new state. For example, a Spime™ object initially requiring 16 gigabytes of memory can be hosted by a host with 32 gigabytes of memory capacity. The Spime™ object can grow in responsibility by assigning itself or being assigned more processing requirements. For example, a Spime™ object can include an artificial intelligence procedure, which generates new processing functionality and instructions, which require additional memory. For example, a Spime™ object can grow to require current capability requirements which exceed current host resources or which reach a criteria for migration. For example, a Spime™ object can outgrow its host's memory capacity. When a Spime™ object increases its host's memory capacity or other current capability parameter, the Spime™ object stores information to reflect its new updated state. The Spime self-determination apparatus of claim 1, wherein the Spime™ object includes instructions of a procedure, e.g., an artificial intelligence procedure, which generates new processing functionality and instructions, which require an update to its current capability parameters. The Spime self-determination apparatus of claim 1, wherein the Spime™ object includes instructions of a procedure, e.g., an artificial intelligence procedure, which monitors its memory requirements.

In an embodiment, capability parameters required to determine or evaluate capability of hosting a Spime™ object can adapt to system changes including changes in resources associated with the most local host device, or local distributed platform hosting device groups, or a group of available host devices. In an embodiment, capability parameters can include distance vector information or link state information or both when evaluating a potential host device. For example, in an embodiment of a Spime™ object or a Spime™ process, routing protocol information can be used to make a current capability parameter determination or migration determination. Information from routing protocols, such as routing protocol information (RIP), open shortest path first (OSPF), or a routing protocol including artificial intelligence determinations including using a predetermined path, or a protocol using a combination of distance vector routing and link state routing, or a protocol that maintains the states of available neighboring host devices, e.g., available agent Spime™ host devices or other possible combination of routing protocols described herein or a service announcement protocol, with distance information and service (capability) parameter information, such as SoDa protocol, or a protocol otherwise known to a person having ordinary skill in the art at the time of the filing of this invention having the benefit of the description herein can be used with embodiments described herein.

As illustrated in FIG. 2, in an embodiment, a Spime™ object 202 is stored and executed in a Spime™ self-determination apparatus 204. Apparatus 204 includes other software modules, such as a Spime™ announcement module 212, a Spime™ host evaluator module 214, and a Spime™ migration module 216, and can include a Spime™ local resource manager object 230 or module. Memory 222 can be allocated or distributed in Spime™ host device 206 to store each Spime™ object and module. In an alternative embodiment, the stored instructions of any one or more of modules 212, 214, 216 or object 230 can be included in the Spime™ object 202 and not coded or fixed at a separate physical memory location. Other embodiments described herein can use alternative embodiments of Spime™ object architecture, as known to one of ordinary skill in the art at the time of this invention having the benefit of the description herein.

In an embodiment, a Spime™ self-determination apparatus 204 comprises a Spime™ object 202 including Spime™ object software including instructions to execute a portion of a service which is part of at least one service provided by a system 100 including a distributed computing platform, instructions to determine its own Spime™ object capability parameters, and instructions to store information about at least one target Spime™ host device; a Spime™ announcement module 212 to generate an announcement message reporting presence of a Spime™ service type and the Spime™ object capability parameters of the Spime™ self-determination apparatus 204; a Spime™ host evaluator module 214 to receive information from other Spime™ announcement messages, to evaluate current host device capability parameters with respect to the Spime™ object capability parameters or target capability parameters, to determine when the current host device capability parameters meet a criterion, and to initiate a migration request message from the Spime™ object 202, including software code and processing instructions and service function instructions, to a target Spime™ object host module, when the module capability parameters meet a criterion; a Spime™ migration module 216 to migrate the Spime™ object to the target Spime™ host device while not disrupting a system availability level of the system.

FIG. 2 illustrates an embodiment of a Spime™ host device 206 including some example hardware resources. Hardware resources are examples of current capability parameters of Spime™ object 202. For example, a particular memory 222, processor 224, and a network interface module 226 can meet the current capability parameters of Spime™ object 202. A different Spime™ object 202 embodiment can require other software or hardware or combination of requirements of capability parameters. For example, an embodiment of a host resource manager object 232 or module can be used to manage the hardware associated with a host device 206. The object or module can be stored more local to the hardware resources than the storage of the software resources associated with the self-determination apparatus. Storage location of manager objects can be associated based upon the most local system architecture or some other level of system architecture.

Spime™ announcement module 212 generates an announcement message reporting presence of the Spime™ object 202 and current capability parameters of the self-determination apparatus 204 associated with the particular Spime™ object 202. For example, any of the information in the service announcement messages described in U.S. Pat. No. 9,322,668 can be included in an embodiment of a Spime™ announcement message described herein. For example, an embodiment of a service announcement message includes information from or including any one or more from the following list of possible service announcement messages: agent service announcement, logger service announcement, storage unit announcement, event monitoring and alerting announcement, search engine announcement, visualization announcement, data filtering announcement, autodiscovery announcement, inventory announcement, issue correlation announcement, report manager announcement, user management announcement, map tile service announcement, content manager announcement, insite map announcement, issue manager announcement, report manager announcement, customer portal announcement, end-user portal announcement, data export service announcement, interface announcement, or service announcement messages described herein.

As described above, capability parameters required to evaluate or determine potential hosting of a Spime™ object can adapt to host or system changes, including changes in resources associated with a host device or local device including information obtained from any routing protocol, such as RIP, OSPF, a combination, a proprietary routing protocol, or a routing protocol including artificial intelligence determinations.

Each of the service announcement messages can have associated predetermined current capability parameters including a particular hardware or software or combination resource required for the operation of the service performance instructions of the particular Spime™ object 202. In an embodiment, a Spime™ object 202 tracks and updates its capability parameters including associated resource requirements and stores information about optimal operation including minimal, or sufficient, or economical values associated with its required resources and capability parameters.

A Spime™ object 202 can store a single set of one or more minimal resources required or optimal resources required. The set of minimal or optimal resources required can be described as capability parameters for the object. For example, a Spime™ object 202 of the service type long-term storage can send a long-term storage service announcement message to another module, such as a receiving module including a Spime™ host device or Spime™ available agent device.

The receiving module can receive the announcement message and imply one or more capability parameters are necessary or optimal to host the Spime™ object 202 of the particular service type, e.g., long-term storage. For example, a pre-determined set of capability parameters can be associated with a particular announcement message type across some logical system delineation or hardware architecture specification. For example, receipt of a particular service type announcement message can imply a pre-determined specified amount of memory and a pre-determined specified amount of processing power is required to operate, for example, a long-term storage Spime™ object 202 at a host device, such as a Spime™ host device 206. For example, the below table, Table 1, lists some service type indications and some respective current capability parameter requirements that would be pre-determined, and so implied, by receiving their corresponding announcement message. The corresponding implied or explicitly specified current capability requirements can go up to any number n. Some examples of current capability parameters are listed below.

TABLE 1

| Type of Service | Current capability parameter 1: | Current capability parameter 2: | Current capability parameter n: |
| --- | --- | --- | --- |
| logger service announcement | memory: e.g., minimum of 16 megabytes of addressable memory and pointers | processing performance: e.g., provision or authorization or quality of access of 10 Gigabit per second bandwidth to the customer data (e.g., when real time analytics connectivity is a memory requirement) | legal jurisdiction: e.g., Maintain borders of specific entity (e.g. German) jurisdiction |
| storage unit announcement | memory: e.g., minimum of 122 Gigabit local capability | processing performance: e.g., provision or authorization or quality of access of 10 Gigabit per second | legal jurisdiction: e.g., Maintain borders of specific entity (e.g. German) jurisdiction |

Figure 3:
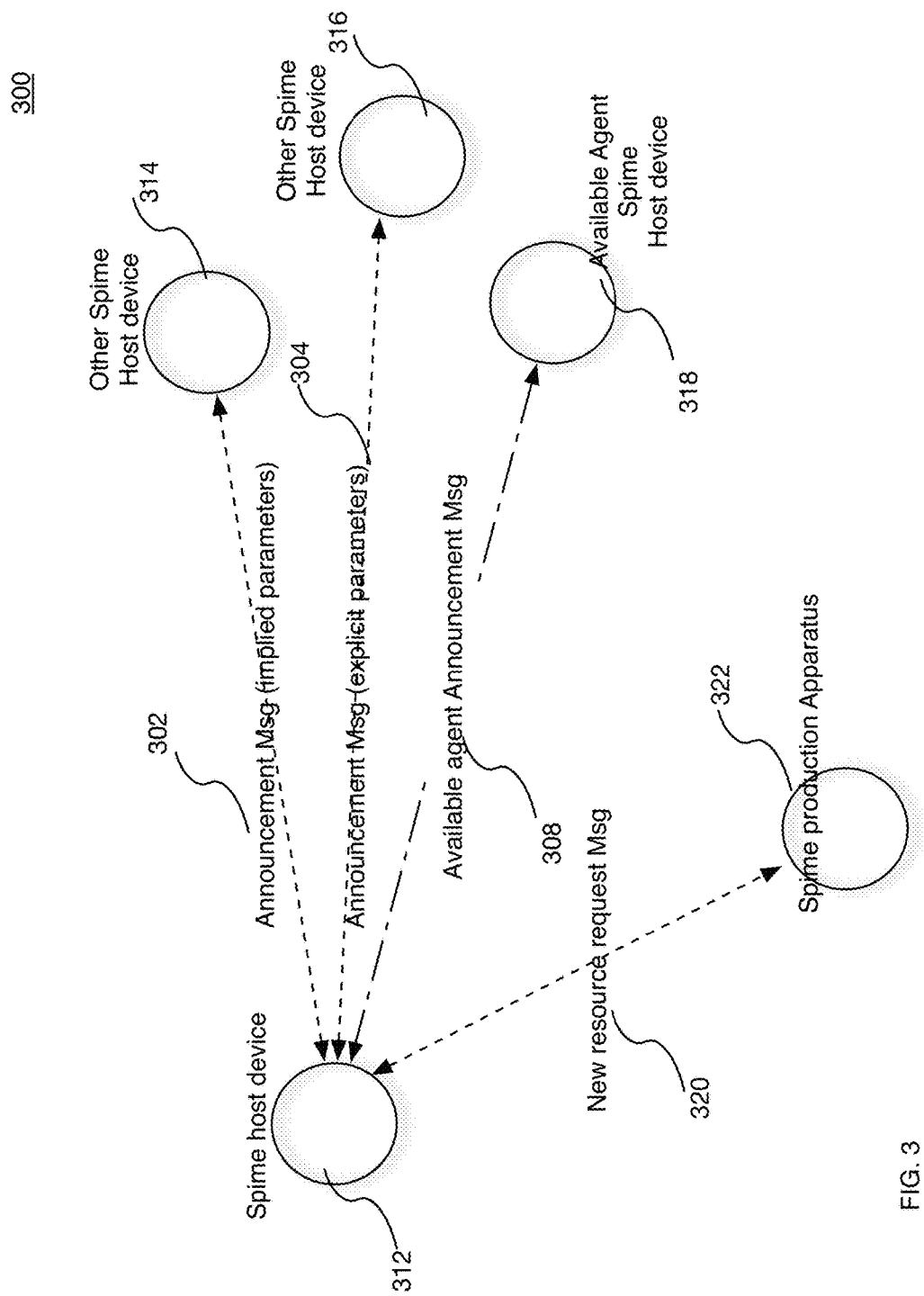
FIG. 3 illustrates example message flows between different Spime™ host devices in accordance with an embodiment of the present disclosure.

FIG. 3, in combination with FIG. 1 and FIG. 2, illustrate embodiments of some Spime™ protocol message processes 300 including particular protocol messages. Messages can be communicated between embodiments of Spime™ self-determination apparatuses e.g., 102, 204 via a Spime™ host device 206 to another Spime™ host device 206, which can be selected as the target host device. For example, an announcement message 302 with its respective implied, as described above, or explicit current capability requirements can be transmitted to or from a first Spime™ host device 312 and to or from another Spime™ host device 314.

In another embodiment, the Spime™ announcement module 212 of FIG. 2 obtains information of the particular current capability requirements from its associated Spime™ object 202. The Spime™ announcement module 212 generates an announcement message 304, which is populated with information generated from its retrieved current capability requirements.

Figure 4:
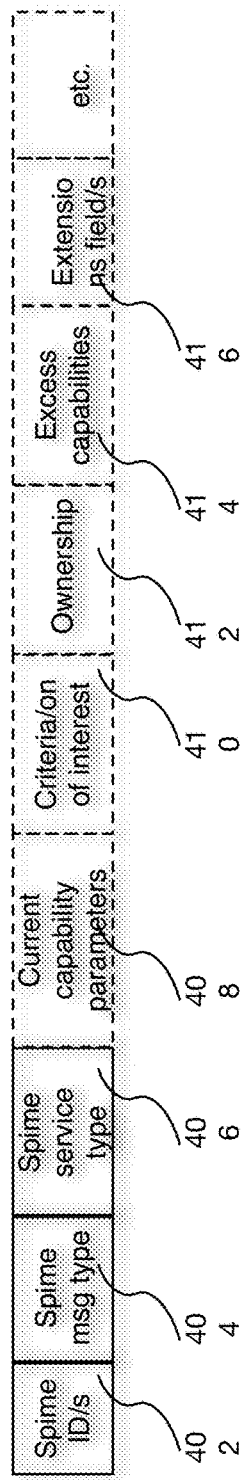
FIG. 4 illustrates an exemplary Spime™ announcement message in accordance with an embodiment of the present disclosure.

FIG. 4 illustrates an embodiment of information, which can be transmitted via a Spime™ protocol announcement message 304. Other message structures, including other order of the information described herein, is included in other embodiments of Spime™ protocol messages described herein. FIG. 4 illustrates an embodiment of Spime™ announcement message 400, which can be generated by the Spime™ announcement module 212. For example, Spime™ message 400 includes a Spime™ identifier (ID) field 402, a Spime™ message type field 404, a Spime™ service type field 406. In an embodiment, Spime™ message 400 can include an explicit indication of current capability parameters in field 408.

Other fields containing other information can also be included in other embodiments indicated as such in FIGS. 4-10 with the use of dashed-line depictions, e.g., fields, such as ownership, extension, Spime™ payload information, additional payload information, Spime™ history data, etc. Additional information not listed herein but known to one of ordinary skill in the art at the time of the invention having the benefit of the description herein can be transmitted using an additional field, e.g., field labeled etc. In an embodiment, additional fields can be used to transmit information pertaining to cryptographic verification-of-authenticity, authentication, or secrecy.

In an embodiment, explicit current capability parameters can be indicated in field 408. For example, an identification of one or more criterion of interest field 410 can be used to indicate which current parameter capabilities are more important than others. In an embodiment, an ownership field 412 can announce what entity has ownership of the Spime™ object. Ownership can indicate which entity or service provider owns the physical or logical Spime™ object representation. In an alternative embodiment, ownership can be shared or ownership rights can be subject to jurisdictional laws of property and intellectual property rights. Some Spime™ objects 202 include a capability parameter indicating that it can only be hosted by devices on a particular manufacturer-owned Spime™ system, while others can migrate to other manufacturer's Spime™ systems. Some Spime™ objects 202 include a capability parameter indicating that it can only be hosted where the legal jurisdiction requirement is met.

Other fields include an excess capabilities field 414, whereby, for example, a Spime™ host device 206 announces that it has excess resources including capability parameters to possibly host another Spime™ object 202. Another field is one or more of an extension field 416, which can be configured to enable the Spime™ self-determination apparatus 204 to take on additional functionality, which can be particular to an embodiment of the Spime™ host system 100. In an embodiment, cryptography or digital signature information or a combination of both is provided in a field of the announcement message or other Spime™ protocol messages described herein, e.g., via the extension field or another type of dedicated field. In an embodiment, extension field 416 includes a specific field particular for a particular user and their requirements. The coding and length of the fields can be set initially or configured later or reconfigured as needed.

In an embodiment, a Spime™ object 202 can set flags in a pre-specified bit stream in the current capability parameters field 408. In an embodiment, field 408 can include bits indicating a pointer to a storage location or a pointer to instructions on how to read storage location bits of the field 408. In an embodiment, field 408 can include bits indicating predetermined code instructions.

Information designated by the field 408 can indicate physical current capability parameters including any one of the following: processing speed, memory, SRAM, processing performance, instructions per cycle, floating-point operations per potential transfer host, computing capacity, computing load maximum per requested process, internal storage capacity, number of CPUs cache memory, different level cache memory including second level cache etc., main memory, hard drive capacity, memory bandwidth, input/output bandwidth, communications bandwidth, communications throughput, memory controller parameters, remote associated storage capacity, or any combination of the herein listed current capability parameters, or a logical capability parameter associated with a particular service capability.

The current capability parameters include physical current capability parameters including any one of: processing speed, memory, SRAM, processing performance, instructions per cycle, floating-point operations per potential transfer host, computing capacity, computing load maximum per requested process, internal storage capacity, number of CPUs cache memory, different level cache memory including second level cache etc., main memory, hard drive capacity, memory bandwidth, input/output bandwidth, communications bandwidth, communications throughput, memory controller parameters, or remote associated storage capacity, or any combination including one or more of the physical current capability parameters.

Information designated by the field 408 can indicate other logical current capability parameters including any one or more of the following: data security, security level, security cost limit, legal jurisdiction, privacy selection, advertiser selection, economic requirement, financial requirement, energy efficiency, energy cost, energy source, energy use, operation cost, relative trust, geographic location, ownership, communications cost limit, and availability.

Logical current capability parameters include any one of: data security type, security level, security cost limit, legal jurisdiction, privacy selection, advertiser selection, economic requirement, financial requirement, energy efficiency, energy cost, energy source, energy use, operation cost, relative trust, geographic location, ownership, communications cost limit, or availability, or a logical capability parameter associated with a particular service capability, or any combination including one or more of the logical current capability parameters.

Referring back to FIG. 3, in an embodiment of a Spime™ host system 100, the system can include a free agent Spime™ host device 318. The available agent device 318 can be made available after an upgrade of new resources is made into the system 100. The new resource and its associated capability parameters can be identified to the system 100 by its generating a available agent announcement message 308.

Figure 5:
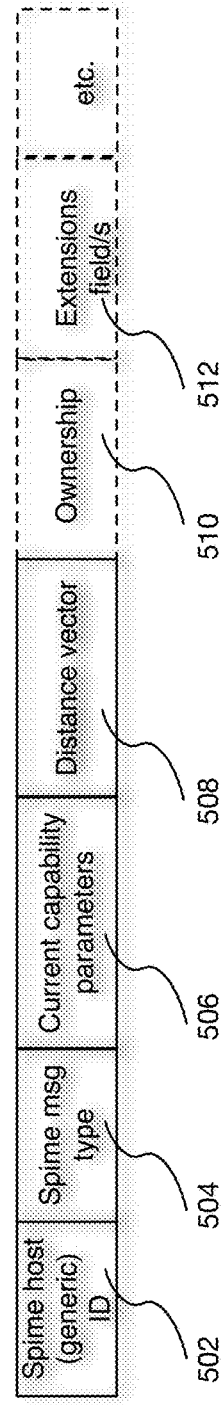
FIG. 5 illustrates an exemplary Spime™ available agent announcement message in accordance with an embodiment of the present disclosure.

FIG. 5 illustrates an exemplary Spime™ free host announcement message 500 in accordance with an embodiment of the present disclosure. An embodiment of a Spime™ free host announcement message 500 can include a Spime™ host identifier (ID) field 502, a Spime™ message type field 504, a current capabilities field 506, and a Spime™ distance vector field 508. The Spime™ host ID can be set by a maintenance person or can be automatically generated by a Spime™ object 202, as will be described later. The current capabilities field 506 can be generated by an embodiment of a Spime™ announcement module of an available agent device, similar to the Spime™ announcement module 212 of FIG. 2. An embodiment of the Spime™ distance vector field 508 includes a network distance, such as hop counts, or: GPS information, wifi access point location information, or any other type of location information, etc.

The remaining fields illustrated in the embodiment of the Spime™ free host announcement message 500 include fields, such as an ownership field 510, similar or as the ownership field 412. Other fields include one or more of an extension field 512, which can be configured later after the initial setup of the available agent Spime™ host device 318, to enable the device to take on additional functionality, as described above.

Referring back to the embodiment illustrated in FIG. 1 and FIG. 2, there are times when the Spime™ object 202, for example a long-term storage Spime™ object 102, has taken on additional storage responsibilities. For example, a system may scale to include more storage devices as described in U.S. Pat. No. 9,322,668 incorporated in its entirety by reference herein. In an embodiment, Spime™ object 102 can update its current capability parameters and check if they come close to a criterion, such as the maximum of its current memory resources 222, associated with its current host device 206.

Figure 6:
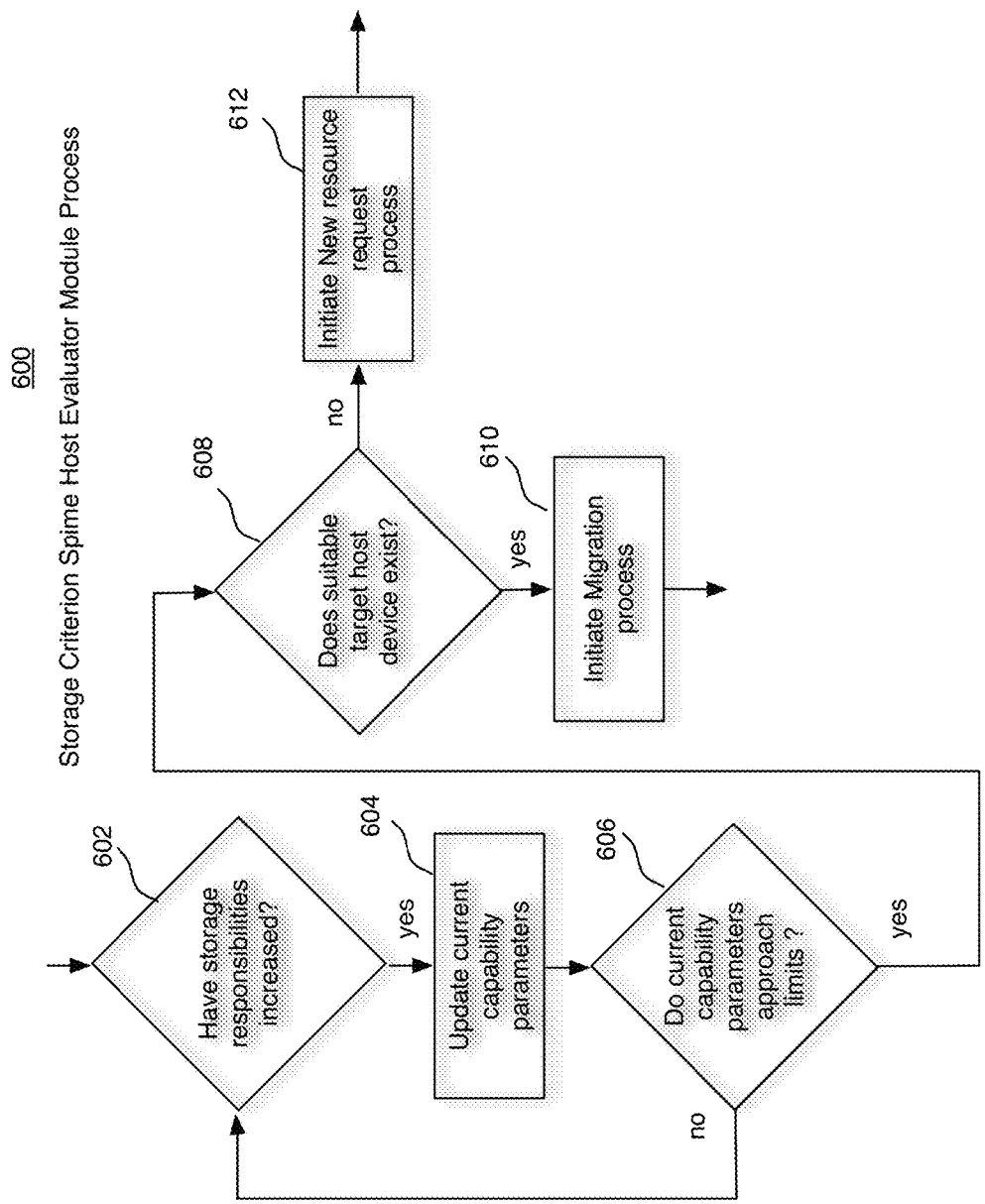
FIG. 6 illustrates a flow diagram of a Spime™ host evaluator module process in accordance with an embodiment of the present disclosure.

FIG. 6 illustrates a flow diagram of an embodiment of a process 600 executed by instructions of the Spime™ Host Evaluator module 214. Process 600 includes determining whether current capability parameters, e.g., storage responsibilities or data throughput processing requirements have increased (602). If yes, then the Spime™ host evaluator module 214 updates its current capability parameters accordingly (604) and checks whether the updated capability parameters approach a criterion, such as the limits of the current host resources (606). Example host resources include hardware embodiments illustrated in FIG. 2, e.g., memory 222 or processor 224 or network interface 226 or other resources which would be associated with any of the other current capability parameters listed herein or otherwise. If a criterion is met, e.g., limits are being approached (or violated, depending on the particular capability parameter or otherwise depending upon the particular capability parameter) according to an associated threshold setting, then the Spime™ host evaluator module 214 process determines whether a suitable target host device exists (608). If yes, it will initiate a migration procedure (610). If not, it will initiate a new resource request procedure (612). The migration module can migrate the Spime™ object to the target host device in an effort to not reduce a system availability level of the system, e.g., by including maintaining an instance of the object at an originator host device until the migration is complete or other means available.

In other embodiments, a Spime™ object can migrate to a location determined to be in greater proximity to a particular resource of the system. In other embodiments, a Spime™ object can reproduce, for example, to provide access to locally collected data or to provide expanded storage capacity. Such providing of expanded storage capacity can be a part of an embodiment of a data collection service.

Referring back to the procedure illustrated in FIG. 6, if the storage capacity of all of the storage service providing Spime™ objects associated with current physical storage capabilities (local or across a network) of a Spime™ system are have reached a limit, then the Spime™ object requiring the increased storage would request a new resource for the Spime™ system by sending a Spime™ new resource request message 700 to a type of Spime™ object. A particular type of Spime™ object can initiate production of the required device.

Figure 7:
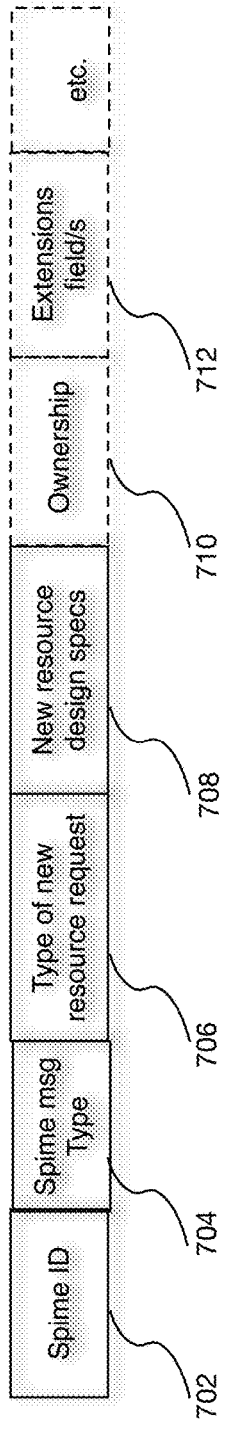
FIG. 7 illustrates an exemplary Spime™ new resource request message in accordance with an embodiment of the present disclosure.

FIG. 7 illustrates an embodiment of a Spime™ new resource request message 700. Referring back to FIG. 3, a Spime™ host device 302 can send a Spime™ new resource request message 320 to an embodiment of Spime™ production apparatus 322. For example, a Spime™ host system 100 includes a 3-dimensional printing resource and its associated Spime™ production module 322. In the example embodiment, a Spime™ production module 322 is a Spime™ object with instructions to produce a 3-dimensional model in accordance with the design specification it receives from the Spime™ new resource request message 320.

A Spime™ production module 322 receives the message 320 and then generates communications with a system associated with a manufacturer of the product or it can control a Spime™ 3-dimensional-printer module to produce the specified product. In a simple example, the system associated with the manufacturer of the requested product can be a system that receives an email generated by the Spime™ production module 322 or it may be a more automated system, which receives specifications for the design of the newly requested product and generates the product. The newly requested product can be assigned a Spime™ object automatically in accordance with a Spime™ ID generating procedure. The Spime™ generating procedure can be performed by the requesting Spime™ object or by the target Spime™ object. For example, a Spime™ generating procedure can include generating an identification including a unique manufacturer trademark combination with a sequential or random generated number up to a numerical limit or not limited. Any unique identification generating procedure can be implemented with embodiments herein.

For example, in the embodiment illustrated in FIG. 7, Spime™ Host Evaluator module 214 generates a new resource request message at block (612). The message includes the requesting Spime™ ID field 702 including the ID of the Spime™ object 202 associated with the requesting Spime™ Host Evaluator module 214. The message further includes a message type field 704 identifying the message as being a particular kind. In this example, the message type is a Spime™ new resource message.

Embodiments of message 700 include a Type of new resource request indicator field 706. This field indicates, to Spime™ production modules 322, which kind of Spime™ production module should act upon receipt of the message 700. For example, a Spime™ production module designed to produce memory would respond when the Type of New Resource Request indicates "memory" as the resource type. In another example, a Spime™ production module, designed to produce hosting hardware would respond accordingly when the Type of New Resource Request indicates "new hardware" as the resource type. In another example, a Spime™ production module designed to produce a product would respond accordingly when the Type of New Resource Request indicates "new product" as the resource type.

Embodiments of message 700 include a new resource design specification field 708, which may be a pointer to a location in the Spime™ system 100 where a larger set of more particular data may be stored. For example, a particular Spime™ object 202 may generate a custom design specification. In an alternative embodiment, the field 708 may have preconfigured design specification data associated with a particular field setting or bit code. Embodiments of message 700 include the optional ownership field 710 and extension field 712, similar to or as described above.

Figure 8:
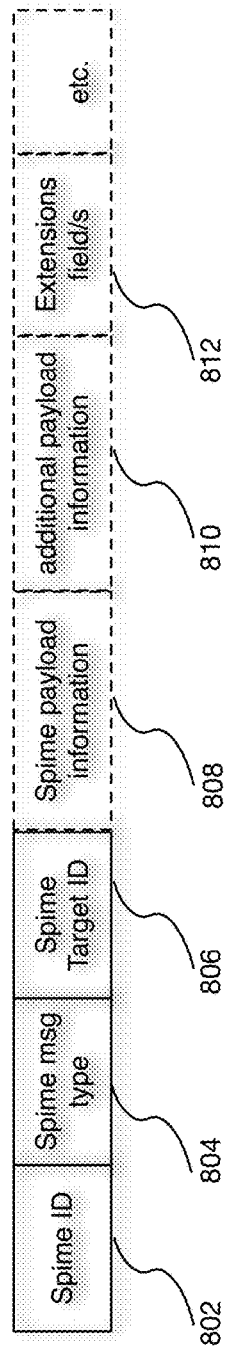
FIG. 8 illustrates an exemplary initiate Spime™ migration message in accordance with an embodiment of the present disclosure.

Referring back to FIG. 3, when the Spime™ host evaluator module initiates Migration procedure (610), the embodiments of the Spime™ Migration module 216 will start a Spime™ module transfer process by generating Spime™ migration messages. FIGS. 8-10 illustrate some example embodiments of Spime™ migration protocol messages 800, 900, 1000.

FIG. 8 illustrates an embodiment of an Initiate Spime™ module migration message 800. It includes a Spime™ ID field 802 indicating the ID of the Spime™ object, which is initiating the migration process. Message 800 includes a Spime™ Msg type field 804 indicating the message to be an Initiate Spime™ Module Migration message type. Message 800 includes the ID of the Target Host Device, which was selected by the Spime™ host evaluator module 214 and communicated to the Spime™ Migration module 216. Message 800 can include payload information in its initial migration message in a payload field 808. Additional payload information fields 810 and so on can also be used. Message 800 can also include an extension field 812. In an alternative embodiment, message 800 can leave all payload information to be migrated by one or more Spime™ Migration messages 900.

FIG. 9 illustrates an embodiment of a Spime™ module migration message 900. It includes a Spime™ ID field 902, Spime™ message type field 904, and Spime™ target ID field 906. It also includes payload information. In an embodiment Spime™ payload information includes Spime™ object 202 instructions 920 and Spime™ object 202 history data information 922. In an embodiment, one or both of, instructions 920 or history data 922 is set with actual data in the payload field 908 itself or one or both of field 920 or 922 can identify a pointer location of where the respective data is stored. For example, Spime™ instructions field 920 can be set to a pointer, which, for example, includes an address in the Spime™ host system 100, or elsewhere including outside the Spime™ host system, such as a URL location, where the payload information is stored. Spime™ History data field 922 can be set to a pointer.

Spime™ Migration module 216 communicates all of the Spime™ module migration messages 900 needed to migrate the Spime™ Object instructions 920 or Spime™ history data 922 or both to a Spime™ target host device. Any transport technology is capable of use to perform the migration process. After the migration of the Spime™ object instructions 920 and Spime™ history data is complete, the Spime™ migration module sends a Complete Spime™ module transfer message 1000.

FIG. 10 illustrates an embodiment of a Complete the Spime™ Module Transfer Message 1000. Message 1000 includes a Spime™ ID field 1002, a Spime™ message type field indicating this is an instruction to Complete Spime™ Module Transfer Message type. This can be enough information to signal to the Target Spime™ host device to initiate action in accordance with its Spime™ object 202 instructions. After the Spime™ Migration Module 216 has sent this message out, the Spime™ Migration Module 216 removes the Spime™ object 202 from its previous host device. In an embodiment of a Spime™ Host system 100, a Spime™ object 202 indicated by its associated ID may be hosted in only a single Spime™ host device 206.

In an embodiment, when a Spime™ object 202 migrates to a Spime™ target host device, which is a Spime™ Host device 316 similar to its previous Spime™ host device 312, the Spime™ object 202 provides information to the existing announcement module 212, evaluator module 214, and migration module 216 of the target device so that the modules generate the processes and messages the originating Spime™ object 202 and host device were capable of producing.

In an embodiment, when a Spime™ object 202 migrates to a Spime™ target host device, the entire contents of its associated self-determination apparatus 204 including the announcement 212, evaluator 214, and migration 216 modules are migrated along to the target host device also.

Figure 11:
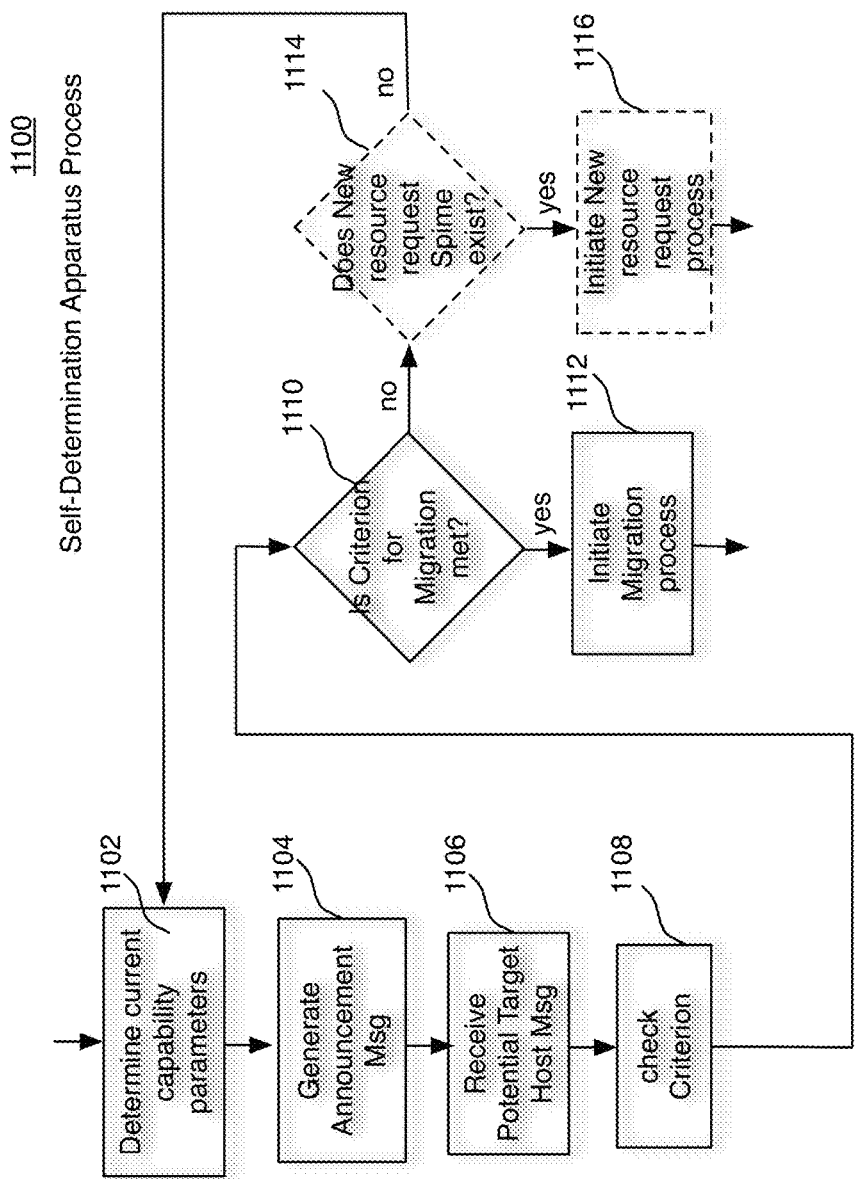
FIG. 11 illustrates a flow diagram of a Spime™ self-determination apparatus process in accordance with an embodiment of the present disclosure.

FIG. 11 illustrates an embodiment of a process 1100 performed by a self-determination apparatus 204. A Spime™ object 202 executes an embodiment of a self-determination apparatus 204 process 1100. The Spime™ object 202 determines what current capability parameters it requires (1102) to provide its particular service. It transfers the information to a Spime™ announcement module 212, which generates a Spime™ announcement message 400 (1104) populated with associated field information. For example, a particular type of Spime™ object type can generate an associated announcement message. In an embodiment, there is a Spime™ object of a type which tracks a product for its life-cycle and it is referred to herein as a manufactured-product-tracker Spime™ object 202. In the example, the announcement message can include a unique Spime™ ID in field 402; an Announcement type Spime™ message type indication in field 404; and a service type, e.g., a manufactured-product-tracker Spime™ service type in field 406.

For example, a particular manufacturer manufactures a product at a particular facility including particular factory details and product design specification details. The product design specification details can be generic or customized to a particular customer. Such manufacturing information and other information can be termed as information associated with the beginning of the life-cycle of a product or other Spime™ object service type entity. The beginning of the life-cycle includes the initiation or instantiation of the life-cycle for the product. An embodiment of a generic manufactured-product-tracker Spime™ object 202 receives and stores beginning of life-cycle information and associates the information with a new unique Spime™ ID. After initialization the generic manufactured-product-tracker Spime™ object 202 has become a particular manufactured-product-tracker Spime™ object 202 with its new unique Spime™ ID.

The particular manufactured-product-tracker type of Spime™ object 202 stores some or all other information acquired along the life-cycle of the product. For example, the Spime™ object 202 can store information about the individual who ordered the product, any change in the product, e.g., degradation of the product, location of the product, use of the product, fit of the product, user measurement information gathered from the product or supplied by the user, etc. Information about the owner of the product can include information such as legal jurisdiction. Information of the owner can include privacy selections the owner chose for his information collected by the Spime™ object 202. Information about the owner can include advertiser selections indicating which advertisers are interested in selling advertisements to the owner or which advertisers the owner has indicated permission to send advertisements or other communications.

Referring back to FIG. 11, using the above embodiment of the manufactured-product-tracker Spime™ object 202 and its associated self-determination apparatus 204 to explain more detail of process 1100, some or all of the information gathered by the Spime™ object 102 can be used to determine current parameter capabilities information eventually transmitted into the field 408 of the announcement message 400. For example, some other information the Spime™ object 202 can acquire is the geographic location of the owner. In an embodiment, the Spime™ object 202 for the example manufactured-product-tracker Spime™ object 202 embodiment can be part of a global Spime™ host system 100. The geographic location of the owner that bought the product can be part of the current capabilities parameters. The geographic location information can be acquired repeatedly to make sure the most up to date geographic location information is stored.

Continuing on with the example, the Spime™ object 202 receives the most current geographic information and updates its current capability parameters to reflect the new information. The customer can travel across the globe and still maintain communications with a Spime™ system 100 embodiment. In the example, the customer moved from a prior home location to a new home location, e.g., the customer moved from New York, N.Y., USA to Sydney, Australia. In this example, the Spime™ object 102 determines its current capability parameters (1102) to include the new home geographic location of Sydney, Australia. The Spime™ object 202 sends the current capability parameters to its associated Spime™ announcement module 212. The Spime™ announcement module 212 generates an embodiment of the announcement message 400 (1104) including an indication that its current capability parameter includes a geographic location update to Sydney, Australia. Spime™ object 102 receives a potential target host message (1106), such as an Announcement message 400 or an available agent host device message 500 from a Spime™ host device 206 having geographic information indicating it is located closer to the owner in Sydney.

Referring back to the embodiment of the flow diagram illustrated in FIG. 11, the Spime™ object 102 which has prior geographic location information of NY will call upon its Spime™ host evaluator module 214 to check its criterion (1108) to see if any of the received messages have information which when run through its specific criterion cause the Spime™ object to have to migrate (1110). In the example, the criterion of geographic location is checked for optimal proximity. If a more optimal proximity criterion is met (1112) by another Spime™ object, or an available host device capable of housing the Spime™ object, the hosting availability information is relayed via an announcement message.

Then Spime™ object 202 can call upon its Spime™ migration module 216 to initiate a migration process including sending migration messages 800, 900, 1000 to the target host device. The target host device met the better proximity criterion, which indicated it had a better geographic location capability parameter. If the better proximity criterion is not met (1110), the Spime™ object 202 determines whether a New Resource Request Spime™ object exists (1114) in its table of possible targets. Possible target information is generated from information received from received potential target host messages (1106), such as an announcement message 400 or an available agent host device message 500. Possible target information can be stored in a possible target table. Spime™ object 202 can receive messages form different types of potential targets. For example, if there is no sufficient target to host the object, then there can be a target that can be generated by a process initiated by the object depending upon what resources are available in the system to which the object is a part. For example, a system can include the capability to generate a new resource. A New Resource Request Spime™ object can be part of a Spime™ production apparatus 322, which is part of the system.

For example, a New resource request Spime™ object 102 from the Spime™ host system 100 or from an outside system which had announced itself as such in the Spime™ service type field 406 of its announcement message 400 can be stored in a table of possible targets of the Spime™ object 202. When its table includes the correct new Resource Request Spime™ object (here the resource requested is a new generic Spime™ host device 206) the Spime™ object 202 initiates a new resource request process (1116) by generating a Spime™ New Resource request message 700 to the corresponding target.

In the example, a generic host device is an available host device 206, which does not have a unique Spime™ ID. A Spime™ host device 206, which hosted a Spime™ object that completed the migration process to the available host device 206, would assign itself a new Spime™ ID after sending a Complete Spime™ module Migration message 1000.

As described herein, the Spime™ object 202 includes numerous current capability requirements and criterion, which can integrate with embodiments of the invention. For example, the above manufactured-product-tracker Spime™ object 202 embodiment had, in the example, a single current capability parameter criterion of geographic location, which caused its Spime™ object to migrate out of its Spime™ host device 206. In other embodiments, there can be evaluation of one or more of the parameters listed herein according to any of the criterion listed herein. In other embodiments, there can be evaluation of one or more of the parameters known to one of ordinary skill in the art at the time of the invention having the benefit of the description herein according to any of the criterion known to one of ordinary skill in the art at the time of the invention having the benefit of the description herein.

Embodiments described herein help solve the existing problem of conventional systems not having enough system availability to meet increased demands of scaling systems. Other embodiments described herein provide other benefits including enabling use of automated and artificial intelligence to make information transfer decisions from Spime™ object to another Spime™ object.

As described above, embodiments of the Spime™ implementation solution provide a solution for increased system availability using the described Spime™ solutions. Envisioning growth and control over larger systems by using a common communication protocol messaging and integration solution as described herein, using the Spime™ implementation solution, leads to other problems that require solving, such as security and privacy maintenance across the larger systems.

Security and privacy and other benefits can also be obtained with the use of embodiments of the Spime™ implementation solution described herein via the setting up of particular capability parameters and criterion including the claims with their most broad and most narrow examples. Data modeling and its implementation is difficult to create when needing to cover scalable systems including microsystems, sub-systems, systems, and larger macrosystems, which can include one or more microsystems that reach large coverage across the globe while maintaining a high data transmission rate. Data structure and meaning between system wide applications must be understood to be effective. Data meaning is made clear in embodiments described herein. Some embodiments of the data modeling and implementations described herein solve the problem of combining legacy systems and devices with newer devices and systems by having a well-defined solution, which can grow and change as needed throughout the life-cycle of the systems.

Figure 12:
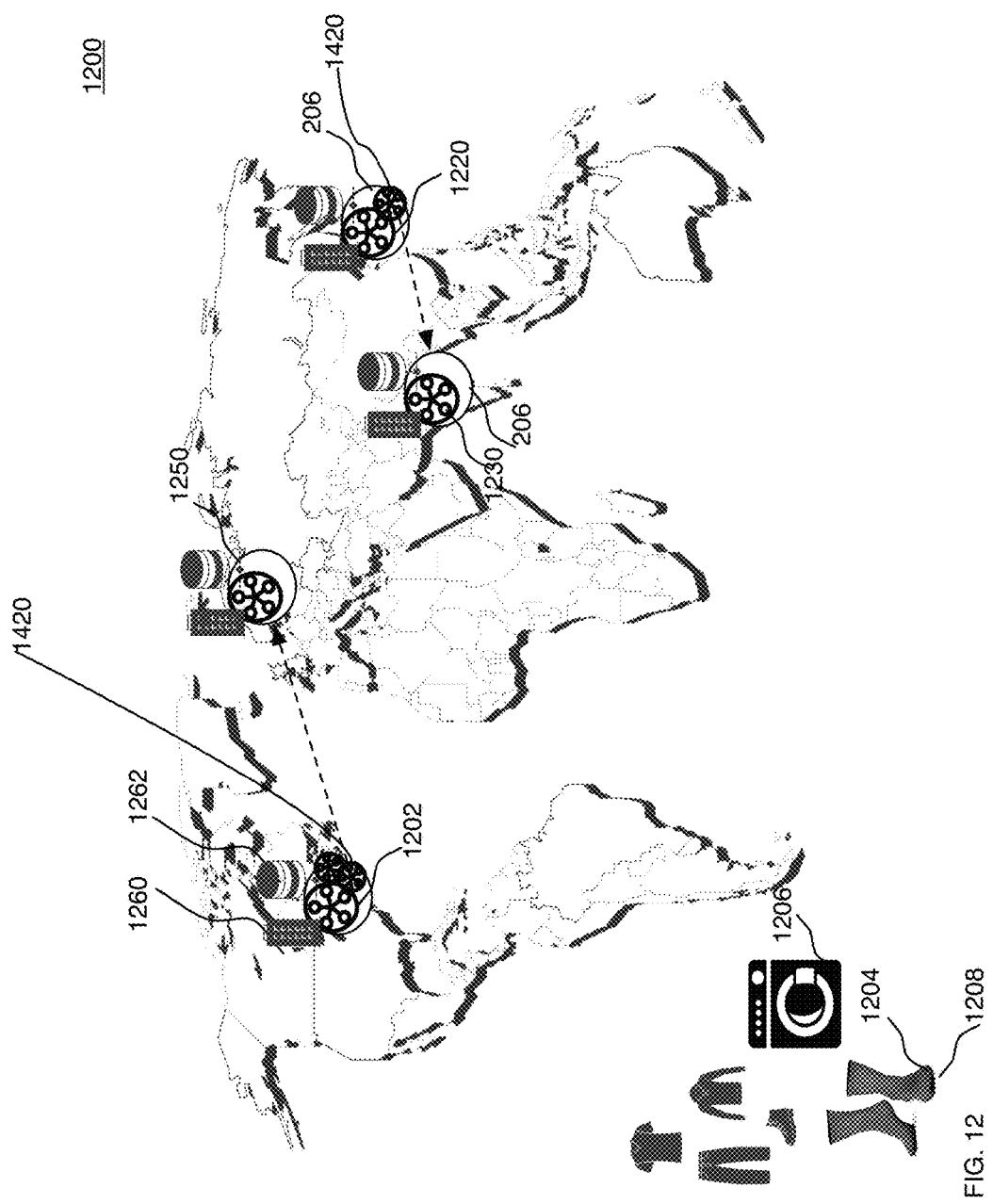
FIG. 12 illustrates an example Spime™ object and Spime™ system in accordance with an embodiment of the present disclosure.

FIG. 12 illustrates another embodiment of a Spime™ system 1200. Spime™ system 1200 provides a manufactured product tracking service. Spime™ system 1200 includes Spime™ objects 202, etc. including another example of a particular manufactured-product-tracker Spime™ object 202, for example a clothing identification Spime™ object 1202. Object 1202 includes instructions to execute a portion of a manufactured product tracking service and instructions to establish and maintain an account with a current manufacturer in cooperation with a corresponding Spime™ object hosted by resources of the manufacturer.

Spime™ object 1202 can receive information gathered from thread sensor information in clothing. A thread sensor can perform agent services of collecting and sending sensor data to an associated Spime™ object in the system. Thread sensor information can be obtained from any paper or cloth item having a thread sensor. For example, paper towel, toilet paper, wipes, diapers, a towel, a sock or shoe, or pant, or top, etc. any article of paper or cloth can have a thread sensor 1204 attached or sewn into it.

An agent device, such as a smart phone or smart home appliance or smart washer or dryer 1206 or combination washer/dryer agent device, can receive information from any sensor, such as thread sensor 1204. See U.S. Pat. No. 9,322,668 herein incorporated in its entirety for more information of agent devices and supporting system resources along with other devices and sensors known at the time of filing this invention with the help of the disclosure herein.

The example dryer agent device 1206 sends clothing product information to its associated Spime™ object 1202. Spime™ object 1202 stores manufactured product tracking service information including life-cycle information of a clothing item e.g., a sock. For example, sock 1208 can have Spime™ object 1202 store associated information it needs to perform its product tracking service. The information can be information the object identified as a capability parameter. Capability parameters can include any one or more items from the following: information regarding its manufacturer, purchase date, price, material, wear time information, washings, wear coordination information (e.g. what other items were worn at same time), etc. Spime™ object 1202 can also store information about the owner of the sock 1208, such as identification information, location information, age, size, foot shape, foot size, etc. Spime™ object 1202 can also store information about objects associated with the sock, like shoe manufacturer information of shoes the owner has. Spime™ object 1202 can also store weather information of the owner's location. Spime™ object 1202 can receive data from different agent devices and store the received information as a capability parameter, such as current quality of an item, degradation level of the item, electrical resistance measurement of the sensor in the item, monthly subscription information for the item, etc.

In an embodiment, Spime™ object 1202 can store and determine its capability parameters to include logical or functional capability parameters including economic information associated with the item it is set to manage. In an embodiment, the total price of an item, or price of shipping an item to an owner, or the total price of both can be stored by object 1202. For example, the total price of the item and shipping to the owner at his residence in NY, NY from the current manufacturer in China can be stored with the current price of $5.00. Spime™ object 1202 can communicate with a current manufacturer Spime™ 1220 to obtain the item price of $0.78.

In an embodiment, a current capability parameter of Spime™ object 1202 includes the current price of the item for a particular customer. Spime™ object 1202 can monitor when the price of the item exceeds a limit price. Spime™ object 1202 can store a limit price for the item as a criterion. When the criterion is met, Spime™ object 1202 can initiate a shop-around-procedure or other procedure associated with the particular Spime™ object.

For example, object 1202 can initiate self-determination apparatus process 1100. Spime™ object 1202 can determine its one or more current capability parameters to include the price it has obtained for one or more clients for an item (1102). Object 1202 can generate an announcement message (1104), similar to the embodiment of the announcement message in FIG. 4, including a Spime™ ID, Spime™ msg type (e.g., announcement), Spime™ service type (e.g., manufactured product tracking service), and current capability parameters including the current item price.

The embodiment of the announcement message can include current item ownership information, which in this embodiment can be the current manufacturer information. In another embodiment, the ownership information can be information of what entity maintains the Spime™ object information, e.g., a cloud based data management provider, such as BaseN™. In another embodiment, the ownership information can be information of what entity is to store the retrieved information.

Referring back to the clothing item cost example embodiment illustrated in FIG. 12, Spime™ object 1202 can send out an embodiment of announcement message 400. Other Spime™ objects 202 of competing item manufacturers, e.g., a manufacturer of an item similar to am item, e.g., sock 1208, can receive the embodiment of announcement message 400. For example, a manufacturer located in China hosts Spime™ object 1220, which has a current purchase agreement with object 1202 for the particular customer. Another manufacturer located in India hosts Spime™ object 1230. Object 1230 can receive the announcement message and can send an embodiment of a Spime™ announcement message 400 including a Spime™ ID, Spime™ msg type, Spime™ service type (e.g., available manufacturer), current function capability parameters (e.g., a lower item price than the current price and ownership information).

Distance vector information can be missing when price of the item outweighs operational communication costs related to the latency caused by the distance between operating resources for the operation of the Spime™ object.

Referring back to the embodiment of a Spime™ self-determination apparatus process 1100, Spime™ 1202 receives the announcement message from Spime™ 1230 as an embodiment of receiving a potential target host message (1108). Spime™ 1202 checks (1108) if its price criterion for migration is met (1110). If the price criterion of the potential target host, e.g., Spime™ object 1230, meets the price criterion of Spime™ object 1202, then Spime™ 1202 initiates a migration procedure (1112) of the instructions to establish and maintain a client account with a manufacturer to be transferred from Spime™ object 1220 to Spime™ object 1230.

The migration procedure can include additional notification and authorization messaging between the Spime™ objects. For example, Spime™ object 1202 can notify the owner of the item of the existence of the Spime™ object that meets the criterion, can wait for authorization, and can then complete migration, including updating other associated Spime™ objects, such as an object that manages billing matters.

In other words, an embodiment of system 1200 includes a distributed computing platform 100 including a plurality of host devices 206, 206, wherein at least one host device 206 includes a self-determination apparatus 204 including an object 1202. Spime™ object 1202 includes instructions to execute a portion of a manufactured-product-tracking service and instructions to establish and maintain an account with a manufacturer, instructions to determine its own function capability parameters (e.g., price of item when using a current manufacturer, as obtained by current manufacturer hosted object 1220).

Object 1202 can store information about at least one target host device (206 of 1230) from which it receives information. The Spime™ self-determination apparatus 204 further includes an announcement module 212 to generate an announcement message 400 reporting presence of a service type (e.g., manufactured-product-tracking service) and object capability parameters (e.g., current price of item).

The Spime™ self-determination apparatus 204 further includes a host evaluator module 214 to receive information from other announcement messages (500 or 400 from 1230) to evaluate target capability parameters (e.g., current price of item in accordance with potential manufacturer). Evaluator module 214 determines when the current function capability parameters meet a criterion (e.g., exceed a price limit or receive a lower price from a target host device), and when the criterion is met, initiates generation of a migration request message (800). Sending a migration request message initiates migration of stored instructions (See FIG. 14, 1420 indicated in FIG. 13 using dashed line depicting migrating, e.g., representing migrating across networks using packet data) from an originator object 1220 and its host device 206 to a target object 1230 and its host device 206.

The originator object 1220 receives the migration message and then the originator object can continue the migration process. The migrated instructions including instructions to manage a client account being in accordance with the manufactured-product tracking service instructions stored by object 1202. The Spime™ self-determination apparatus 204 further includes a Spime™ migration module 216 to manage the migration of the instructions to manage the client account from the originator Spime™ object 1220 host 206 to the target Spime™ object 1230 206. Spime™ migration module 216 manages the migration of the instructions along with its own instructions for communicating outside its new host device using its new local resources of the target host.

In another embodiment, using the illustration in FIG. 12 and assigning a new example to the illustrated Spime™ objects, a provider of maintenance for all or part of a network including a Spime™ system 1200 can own the rights to Spime™ object 1202 or an associated Spime™ object as part of a service agreement to manage information. The agreement can be between the entity providing the maintenance and the owner of an item 1208, or the manufacturer of the item 1208, or a third party.

Each Spime™ object in system 1200 can be associated with its own embodiment of a respective local server e.g., 1260 and storage e.g., 1262. The object's local server and storage can be part of the resources included in the object's host device e.g., 206. Private client information associated with ownership or use of an item e.g., 1208 can be part of the data and instructions included in Spime™ object 1202. Object 1202 can also store instructions, which provide access to the private client information. For example, access can be single use, temporary, or subscription based.

Spime™ object 1202 can include capability parameters including privacy settings. Privacy settings can indicate which entity is allowed access to the private client information. The user or the owner of the item or the owner of information associated with the item can select one or more privacy settings. In an embodiment, the owner (owner of an item 1208, or the manufacturer of the item 1208, or other third party) of the information tracked by Spime™ object 1202 can set a privacy setting to allow information transfer between itself or another object (i.e., originator) and a target Spime™ object for utilization by others, such as advertisers, or manufacturers of similar or associated items in accordance with the privacy setting.

For example, Spime™ object 1202 can store private client information along with privacy settings to control access to the private client information. For example, the privacy settings can include a setting to enable advertisers of particular shoe brands to have temporary access to the private client information. A manufacturer of a shoe item can request access to the private client information, e.g., foot size information. In the example, Spime™ object 1202 determines its current capability parameters to include a privacy setting (1102) and sends out an embodiment of announcement message 400 (1104) including a Spime™ ID, Spime™ message type (e.g., announcement message), Spime™ service type (e.g., private client information and access), current capability parameters (e.g., privacy setting, e.g., allowing access by particular manufacturers of shoe items). Other Spime™ objects receive the announcement message and can read the current capability parameter as including a privacy setting as allowing access by Spime™ objects belonging to different shoe manufacturers interested in obtaining the private client information. In the embodiment, each of Spime™ objects 1220, 1230, 1240, 1250 can receive the announcement message 400 sent by Spime™ object 1202.

Spime™ object 1202 can be a Spime™ object controlled and maintained by a shoe manufacturer. The manufacturer owning Spime™ object 1202 can have stored private client information of a customer who purchased one of their products. Another manufacturer, owning Spime™ object 1250, can already have had access to private owner identification information stored by object 1202. The manufacturer owning Spime™ object 1250 can add instructions to object 1250, which cause it to request for additional private client information, such as access to the more private client information from object 1202, e.g., foot size information, style or color preference information, shopping habit information.

Spime™ object 1202 can send an announcement message 400 (1104) out on a network. The network can include a Spime™ system that communicates across other networks or can be a combination of only Spime™ systems. For example, the Spime™ system 1200 currently hosting Spime™ object 1202 can communicate with other Spime™ systems when the current capability parameters of the object indicate privacy access can be obtained by outside systems, e.g., systems managed by an entity different from the entity managing the current hosting Spime™ system.

Spime™ object 1250 can receive the announcement message (1106) from Spime™ object 1202 and can send a potential target host message. The potential target host message can be in the form of its own announcement message 400 indicating it is a manufacturer and indicating it has current capability parameters including having all or some, or requesting all or some, access to private client information. For example, object 1250 can indicate a desire to have access to some or all of the private client information stored by object 1202. For example, object 1250 can request access to client size information. Spime™ object 1202 can check if the potential target host of Spime™ object 1250 meets a criterion (1108), such as which entities are allowed requested access.

In the embodiment, if the criterion (1110) is met (e.g., access to requested private client information is allowed), then the Spime™ object 1202 can make a copy of the requested object information 1420. In an embodiment, the Spime™ object 1202 can make a copy of the requested object information including the data along with instructions for what to do with the data. The object 1202 can initiate migration of the copy of the requested private client object information (1112) to Spime™ object 1250 for a temporary duration. During the temporary duration time, the Spime™ object 1250 can store the requested and received private client information, e.g. the size information.

In the embodiment, the target host Spime™ object 1250 was only allowed one time access. In another embodiment, the access may be a subscription type access, which defaults to having any update to the private client information migrated. In a large network of systems including systems managed by different entities, it is beneficial to have only one Spime™ object, e.g., object 1202 control access to the private client information. When the criterion is met, object 1202 initiates migration of the requested information and instructions for accessing private client information. Instructions for accessing private client information can include allowed rate of access, or allowed private client information items, or a combination in accordance with a privacy agreement.

In an embodiment, initiation of the migration process or the migrated instructions for accessing the private client information can be used to record an account for a per transaction or other agreed billing arrangement. The billing arrangement can be used to initiate sending of an invoice. For example, the managing entity of Spime™ object 1202 can charge for each migration of information from Spime™ object 1202. For example, after the Spime™ migration module 216 completes a migration it can automatically generate an invoice to the entity, which received the migration. In another embodiment, the invoice can be sent to an entity having an agreement to pay for the migration of particular information including data or execution instructions.

In another embodiment, object 1202 may store private client information and be subject to privacy laws of a given jurisdiction of its current host device 206. If the privacy laws of the jurisdiction change, then object 1202 may announce its capability parameters including privacy requirements. Other objects e.g., object 1250 whose host device falls in a jurisdiction capable of protecting the announced privacy requirements can send an announcement message indicating its jurisdiction. Spime™ object 1250 can evaluate the received capability parameters and determine fit jurisdictional criterion is met and when met can initiate its own migration to the host device 206, which has a jurisdiction, which meets its criteria for privacy requirements.

Figure 13:
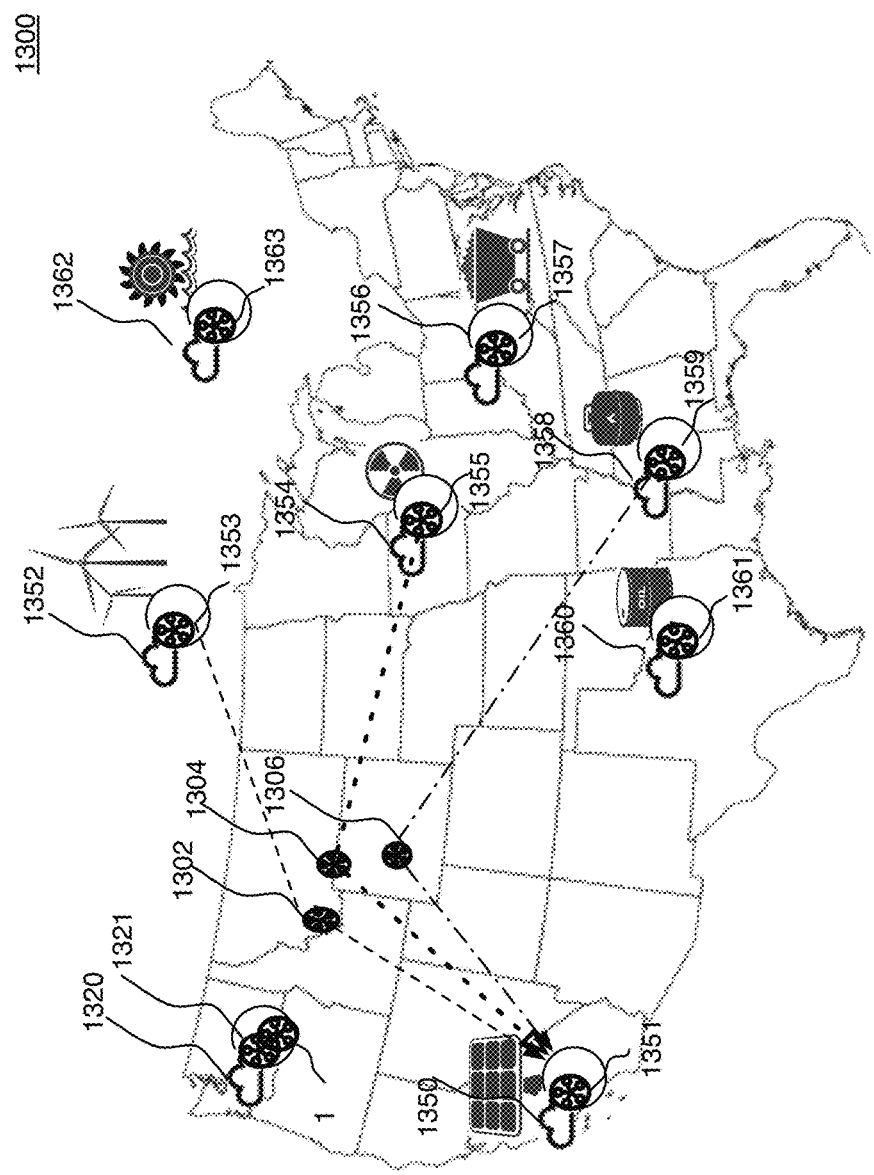
FIG. 13 illustrates an example Spime™ object and Spime™ system in accordance with an embodiment of the present disclosure.

FIG. 13 illustrates an example of a Spime™ system, which can be used with smart grid energy systems. "Smart" is a term that denotes an improvement from old systems. "Smart" as a qualifier can denote any one or more of the following: digital communication capabilities, two way communication where there was none before, distributed technology, sensor measurements, self-monitoring, self-healing, adaptive architecture, more customer choice, pervasive computing (i.e., microprocessors being prevalent throughout the devices in a system), islanding (i.e., continuing to supply power when off of the grid). Smart grid energy systems can include a combination of heterogeneous systems such as a separate system for power generation, transmission, and distribution, along with a system for data management system, and a system for sensor collection, data monitoring and measurement and presentation. Any of these systems individually or as a whole, can be run by one or more separate enterprise entities. Any of these systems individually or as a whole, can benefit from a Spime™ implementation solution.

FIG. 13 illustrates an example communication system 1300 made up of interconnected energy provider systems, each managed by different energy providers, e.g., providers in the US and Canada. For example, each energy provider system can include a cloud based smart grid energy provider infrastructure system. Each system can include subsystems for generating, transporting, and distributing electricity. Each system can be managed and controlled with its own cloud based smart management system and protected by its own smart protection system. Each smart energy provider management system (e.g., solar 1350, wind 1352, nuclear 1354, coal 1356, gas 1358, oil 1360, or hydro 1362) can include an embodiment of a Spime™ implementation solution described herein. For example, each cloud based energy management subsystem includes a respective host device 206 embodiment and respective embodiment of a Spime™ object (e.g., 1351, 1353, 1355, 1357, 159, 1361, 1363) including respective instructions for communicating energy price information.

The large example communication system 1300 can include one or more other cloud based systems, which provide software or platform or infrastructure as a service, such as, for example, a customer management system, an energy market system, bulk generation system, managing energy movement system, etc. The term cloud based herein refers to a capability of delivering on-demand computing solutions to customer requests. Spime™ cloud based systems include Spime™ objects and their resources, processes, and protocol messages as described herein.

In this example, customer management system 1320 manages a customer account, such as individual or group commercial, residential, or industrial user customer accounts. System 1320 includes Spime™ object 1321. Customer management system 1320 can be set as a private cloud or public cloud or some hybrid system or other type of Spime™ system, which communicates with other Spime™ interoperable systems.

Spime™ object 1321 includes instructions establish and manage a customer energy account. The instructions can further include instructions to seek the lowest energy price for a customer account. For example, one or more customer account billing Spime™ object 1302, 1304, 1306 can be stored at a host device at any energy provider management system. FIG. 13 shows with dotted lines the migration of each account from an originator host device to a target host device. Energy manager Spime™ object 1321 includes stored instructions including current capability parameters including energy price associated with the current provider of energy for a customer account. Energy manager Spime™ object 1321 executes an embodiment of Spime™ self-determination apparatus process 1100. Energy manager Spime™ object 1321 can determine its one or more current capability parameters to include current price of energy it has obtained or negotiated for a customer account (1102). Energy manager Spime™ object 1321 can generate an announcement message (1104), similar to the embodiment of the announcement message in FIG. 4, including a Spime™ ID, Spime™ msg type (e.g., announcement), Spime™ service type (e.g., energy manager), and current capability parameters including its import energy price.

One or more of the Spime™ objects (e.g., 1351, 1353, 1355, 1357, 1359, 1361, 1363) of their respective smart energy provider management system (e.g., solar 1350, wind 1352, nuclear 1354, coal 1356, gas 1358, oil 1360, hydro 1362) can receive the announcement message and send back its own announcement message, similar to the embodiment of the announcement message in FIG. 4, including a its own Spime™ ID, Spime™ msg type (e.g., announcement), Spime™ service type (e.g., energy provider), and current capability parameters including its export energy price for a potential customer.

Energy accounts manager Spime™ object 1321 receives one or more Spime™ messages from Spime™ objects 1351, 1353, 1355, 1357, 1359, 1361, and 1363. Energy manager Spime™ object 1321 includes instructions including information of which of its customer accounts have customer billing Spime™ objects, which have migrated onto particular energy provider management systems. For example, energy cost manager Spime™ object 1321 has instructions storing information on where one or more customer account billing Spime™ objects, e.g., a first customer account billing information Spime™ object 1302 and a second customer account billing information Spime™ object 1304 and a third customer account billing information Spime™ 1306 are hosted.

For example, first customer account billing Spime™ object 1302 is initially hosted by the smart energy provider management system (nuclear) 1354 at its Spime™ object 1355; second customer account billing Spime™ object 1304 is hosted by the smart energy provider management system (natural gas) 1354 at its Spime™ object 1359; and third customer account billing Spime™ object 1306 is hosted by the smart energy provider management system (solar) 1350 at its Spime™ object 1351.

Referring back to FIG. 13, FIG. 11, and FIG. 4, energy cost manager Spime™ object 1321 receives the announcement messages from one or more of each energy provider management system Spime™ object 1351, 1353, 1355, 1357, 1359, 1361, 1363 (1106). Energy manager Spime™ object 1321 checks if information it received met a criterion (e.g., export energy price is less than current import energy price) (1108) and checks if criterion for migration (e.g., migrate if export is less than import or e.g., migrate if energy type is preferred from existing energy type) (1110) is met.

Migration, in this embodiment, is migration for the one or more of the individual customer account billing Spime™ objects 1302, 1304, 1306. Spime™ object 1321 includes instructions containing information of all its managed customer account billing Spime™ objects 1302, 1304, 1306 and their Spime™ IDs. After the energy manager Spime™ object 1321 determines what export energy capability parameter meets its criteria best, it stores possible target host information and then checks for migration criteria. Based upon comparison and evaluation of when a possible target host is suitable for migration, it initiates a migration process (1112) for the individual customer account billing Spime™ objects 1302, 1304, 1306 it manages. In an alternative embodiment, a plurality of user accounts can be migrated based upon an evaluation for a single account similar to a group of accounts.

When energy manager Spime™ object 1321 initiates the migration process for each of individual customer account billing Spime™ objects 1302, 1304, 1306 it generates individual embodiments of an initiate Spime™ module migration message (FIG. 8) for one or more of each migrating individual customer account billing Spime™ objects 1302, 1304, 1306. For example, energy provider management system Spime™ object 1350 (solar) had sent an announcement message including capability parameter of export energy cost, which was lower than the current capability parameter of import energy cost, which was included in the announcement message, which Spime™ object 1321 sent out. This met the criterion of the energy manager Spime™ object 1321. This caused the energy manager Spime™ object 1321 to generate an embodiment of an initiate Spime™ module migration message 800 for the individual customer account billing Spime™ objects 1302, 1304 and not Spime™ object 1306 because it was already being hosted by energy provider management system Spime™ object 1350 (solar).

In another embodiment, using FIG. 13, with a different example, customer management system 1320 can include a security level manager Spime™ object 1371. Security level manager Spime™ object 1371 can manage customer account billing Spime™ objects 1302, 1304, and 1306 including instructions including capability parameters including security level information. For example, security level manager Spime™ object 1370 can generate an announcement message embodiment 400 including its Spime™ ID, Spime™ message type (announcement) its Spime™ service type (security check) including an indication of current security level of security, e.g., 3 and a criteria of interest being a higher level of security in field 410 of an embodiment of announcement message 400. In the example, Spime™ energy provider management system Spime™ object 1351 sends back an announcement message indicating it can provide a higher level of security due it having capability parameters including higher level security hardware or physical security resources, which are not found at the current host device of 1353 e.g., of object 1302. Security level manager Spime™ object 1371 can generate a migration message, which initiates migration of object 1302 to the host device in system 1350.

in an alternative embodiment of process 1100, when two options exist meeting the criterion (1108) but not enough criterion is met for migration of individual customer account billing Spime™ objects 1302, 1304, 1306 (1110), then other criteria can be checked (1108) until all criterion is checked. So for example, security level manager Spime™ Object 1371 can look to a secondary criteria, such as lower price or other user energy preference, between the capability parameters indicated in the received announcement messages. After making a migration decision based upon one or more criteria (1110) security manager Spime™ object 1371 initiates a migration process generating a migration message 800 for one or more of the individual customer account billing Spime™ objects 1302, 1304, 1306.

In an alternative embodiment, the functionality of the stored security management instructions can be stored at as a separate object stored with each individual customer account object 1302. Each customer account object can have the functionality described above with respect to object 1321, except that in this embodiment the customer account object evaluates and determines when to move itself from one host to another host when a criterion is met.

Figure 14:
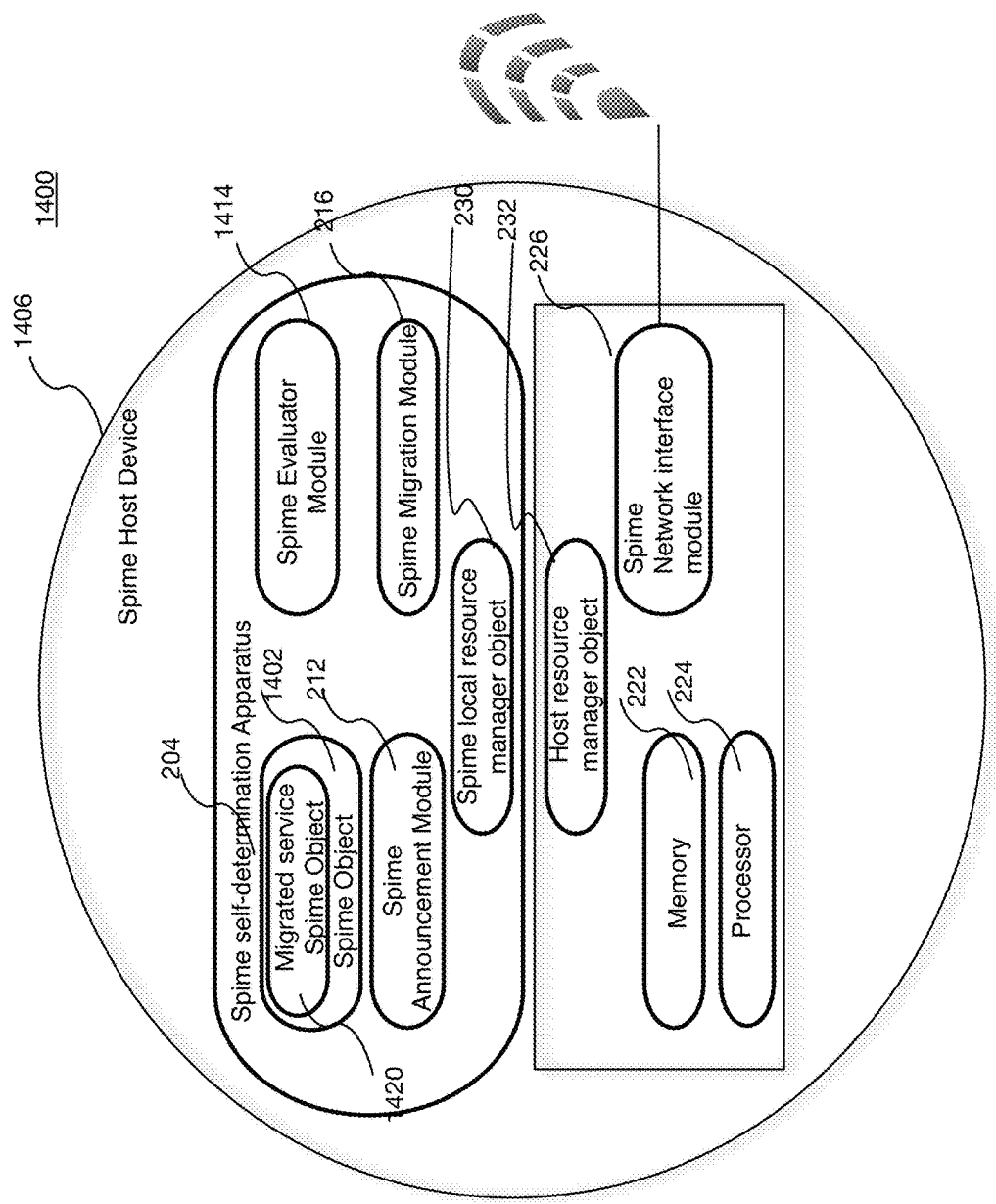
FIG. 14 is a block diagram of example architecture of a Spime™ host device including a Spime™ self-determination apparatus in accordance with an embodiment of the present disclosure.

FIG. 14 illustrates another embodiment of a Spime™ object host device 1406. A Spime™ object host device 1406 includes a Spime™ evaluator object 1414, which evaluates capability parameters. Capability parameters can include physical resource capability parameters (as described above with reference to some embodiments corresponding to FIG. 2) or functional resource capability parameters, as described otherwise herein.

Spime™ host evaluator object 1414 can evaluate capability parameters for migration of an object it manages or for migration of itself. Spime™ host evaluator object 1414 can evaluate capability parameters for migration of an object it manages but where the object is stored at a host device different from its host device. Spime™ host evaluator object 1414 can evaluate capability parameters for migration of an object it manages and wherein the object it manages is stored at the same host device as itself.

In some embodiments described herein, capability parameters are associated with evaluation of physical resources for determining where to host an object. In some embodiments described herein, capability parameters are not associated with physical resources for hosting the object, but are associated with one or more service function capability resources used to serve a Spime™ object 1402 or another associated object that is served by the Spime™ object 1402. For example, Spime™ evaluator object 1414 evaluates services outside of its host device 1406 capable of delivering a product or service to a user associated with account Spime™ object 1402.

In the embodiment, Spime™ migration module 1416 can be used to migrate the object 1402 to another host device, or can be used to migrate a service Spime™ object 1420 originally found outside the host device 1406 to the host device 1406, or can be used to migrate a service Spime™ object 1420 originally found outside the host device 1406 to the another host device outside the host device 1406. Spime™ object 1402 can be added to or updated to include additional instructions from another Spime™ object 1420. Spime™ object 1402 can select another Spime™ object to be migrated into its host device 1406 and stored as part of its Spime™ object 1402. In another embodiment, Spime™ object 1402 can evaluate and determine when to cause itself to be migrated to another host, in accordance with embodiments described herein. In another embodiment, Spime™ object 1402 can evaluate and determine when to cause object 1420 to be migrated to another host device, in accordance with embodiments described herein.

When a migration process is initiated, the process can further include migrating a local resource manager object 230 associated with an object set for migration. The local resource manager object 230 communicates with a host resource manager 232 of a target host device to ensure operation of the migrated object on the target host device.

Figure 15:
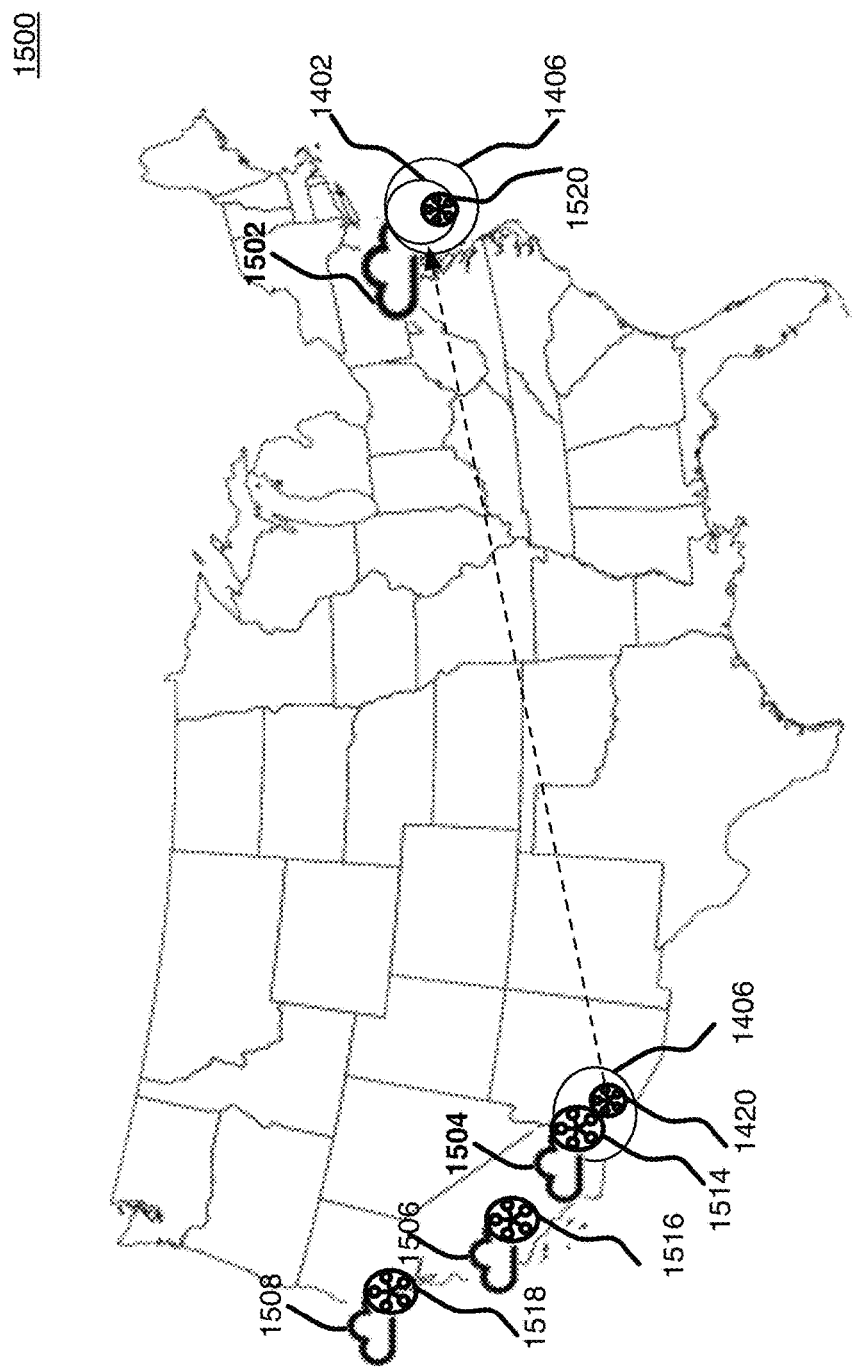
FIG. 15 illustrates an example Spime™ object and Spime™ system in accordance with an embodiment of the present disclosure.
Figure 16:
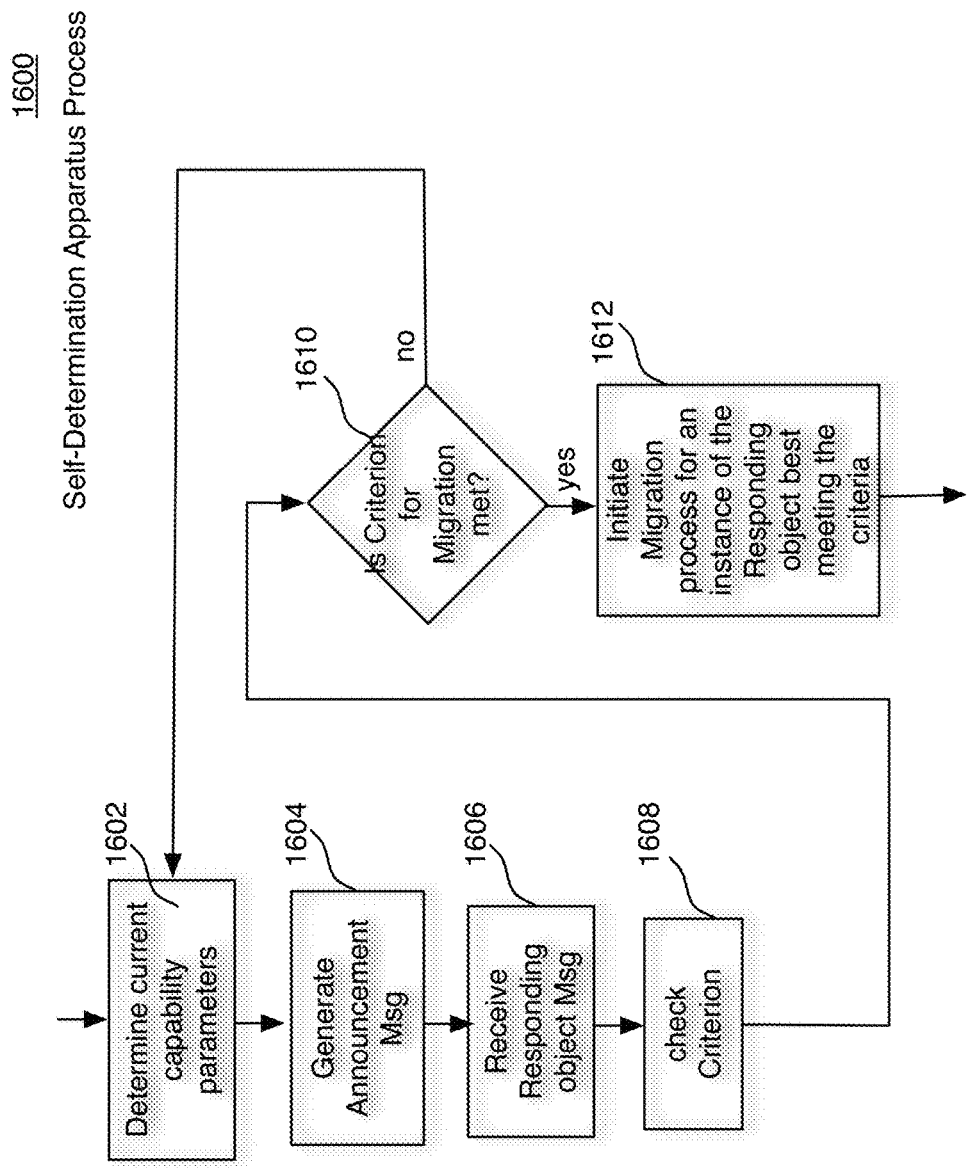
FIG. 16 illustrates a flow diagram of a Spime™ self-determination apparatus process in accordance with an embodiment of the present disclosure.

FIG. 15 and FIG. 16 illustrate an embodiment of a Spime™ system 1500 and process 1600 including an example embodiment of service object 1420 which can be migrated from an originator host device 1406 of system 1504 to a target host device 1406 and object 1402 of system 1502, as indicated with the dashed lines showing the migration propagation across networks coupling the sub-systems 1504 and 1502. For example, Spime™ system 1500 includes sub-systems including a product ordering service Spime™ sub-system 1502 and one or more of a product delivery service Spime™ sub-system 1504, 1506, 1508. Sub-system 1502 can be operated by a manufacturer of a product. The manufacturer is interested in finding a better delivery service to use to deliver its products to a group of its customers.

Object 1520 can keep track of a group of customer orders, including one-time orders, which may be stored for purposes of possibly being repeated, or recurring orders e.g., subscription orders. For example, object 1520 can manage a group of customer wine orders. The orders are for wine from its manufacturing facility located in California. Spime™ object 1520 can store customer account information associated with its determined current service function capability parameters (1602) including a current delivery operation price, including one or more economic options for packaging and delivering of a product. Spime™ object 1520 can determine its current capability parameters to include delivery operation price (1602). Spime™ object 1520 via its host device can generate an announcement message 400 (See FIG. 3, 312 and FIG. 16, 1604) including a Spime™ ID, Spime™ message type (e.g., announcement message), Spime™ service type (e.g., customer account information), current service function capability parameters (e.g., delivery operation price). Spime™ object 1520 via a host device (FIG. 3, 312) can generate an embodiment of announcement message 400 including an ownership field 412 indicating that ownership of any offered objects are to be stored with Spime™ object 1520.

Sub-systems 1504, 1506, 1508 receive the customer account announcement message 400 and generate their own respective Spime™ embodiment of an announcement message 400. For example, Spime™ object 1514 of system 1504 can be a delivery service object, which maintains information of the different delivery services it provides. For example, Spime™ object 1514 sends an embodiment of an announcement message 400 including information about its one or more small unmanned aircraft package delivery service prices, e.g., delivery price per unit, along with a respective associated variable delivery speed.

Spime™ object 1520 receives one or more of the responding announcement messages (1606) from the different delivery option Spime™ objects on its system 1500. For example, Spime™ object 1514 generates an announcement message indicating its current capability parameters of its commercial unmanned aircraft package delivery service price option (e.g., price per unit offered for a specified time) and associated delivery speeds. Spime™ object 1516 generates an announcement message indicating its current capability parameters of its truck package delivery service price option and associated delivery speeds. Spime™ object 1518 generates an announcement message indicating its current capability parameters of its plane package delivery service price option and associated delivery speeds.

Spime™ customer account type object 1520 receives the announcement messages from the responding Spime™ objects (1606) and evaluates the data received with its criterion (1608). For example, Spime™ customer account type object 1520 receives all of the information from the different delivery option Spime™ objects 1514, 1516, 1518 and checks information from their messages against its delivery criterion (1608). For example, the delivery criterion for the example customer can be for lowest price delivery, which can be met by the commercial unmanned aircraft package delivery service Spime™ object 1514. When the criterion is determined to be met by the commercial unmanned aircraft package delivery service Spime™ object 1514 (1610), the initiation of the migration of a particular customer instance 1420 of the object 1514, which met the criteria, to the Spime™ customer account type object 1520.

For example, the commercial unmanned aircraft package delivery service Spime™ object 1514 can instantiate a delivery object with a new Spime™ ID for use by the particular Spime™ customer account type object 1520. For example, commercial unmanned aircraft package delivery service Spime™ object 1514 can then initiate migration of the newly instantiated commercial unmanned aircraft package delivery service Spime™ object 1420 by generating an embodiment of an initiate Spime™ module migration message 800. Migration of packets of one or more corresponding migration messages 800, 900, 1000 can be achieved across any packet data communication system coupling the source and target Spime™ objects.

For example, an embodiment of an initiate Spime™ module migration message 800 in the example above can include a newly generated Spime™ ID, a Spime™ message of the type "migration of instantiated object", a target Spime™ ID of the requesting Spime™ customer account type object 1520, and payload information including the instructions of the new commercial unmanned aircraft package delivery service Spime™ object 1420. In the above example, the commercial unmanned aircraft package delivery service Spime™ object 1420 corresponds to an embodiment of a migrated service Spime™ object 1420 in FIG. 14 and the requesting Spime™ customer account type object 1520 can be part of an embodiment of the Spime™ object 1402 in FIG. 14.

Figure 17:
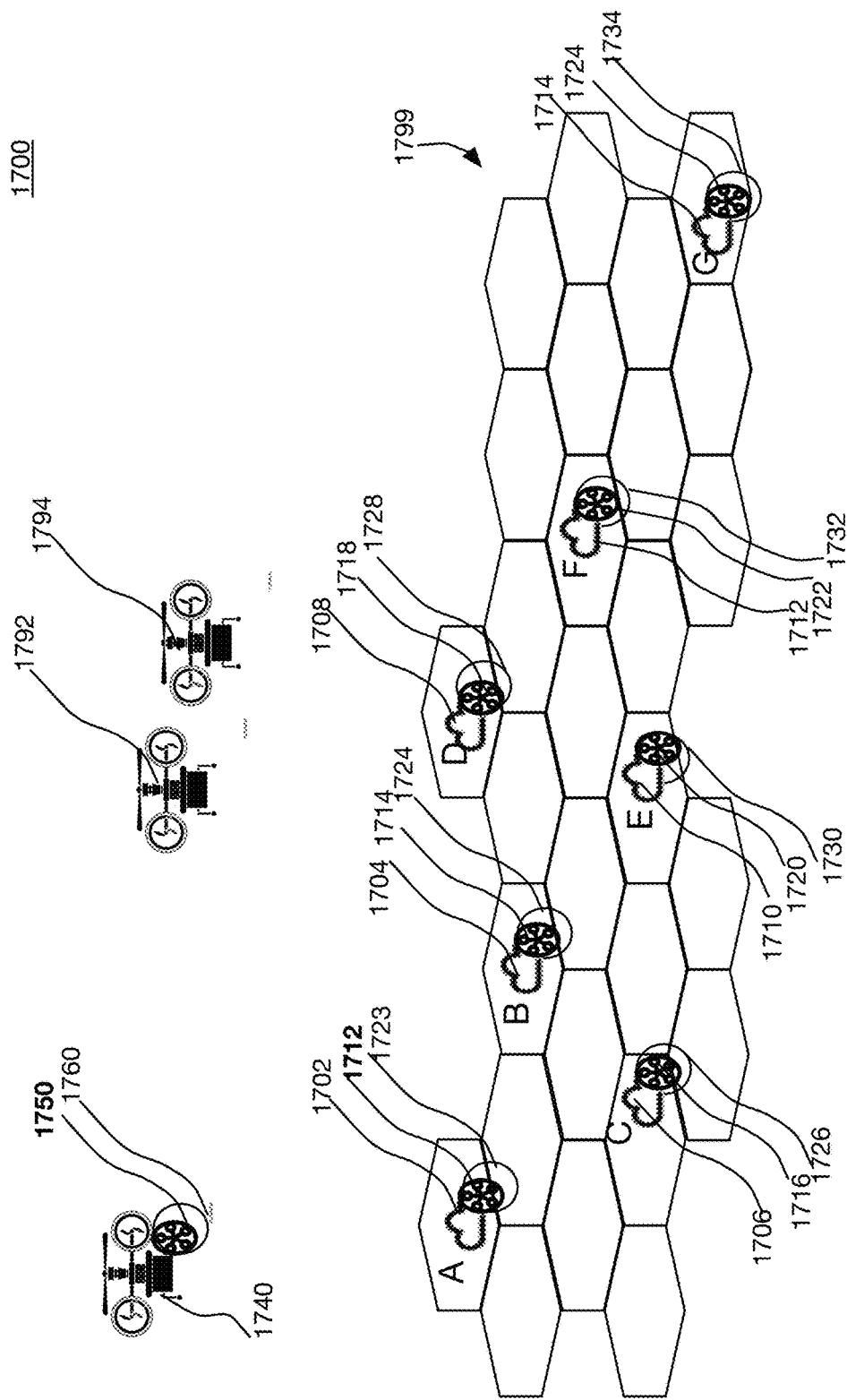
FIG. 17 illustrates an example Spime™ object and Spime™ system in accordance with an embodiment of the present disclosure.

FIG. 17 illustrates an example Spime™ object and Spime™ system in accordance with an embodiment of the present disclosure. Spime™ macro-system 1700 includes systems with coverage across large areas, which can include satellite communication systems (not shown). Spime™ system 1700 also includes land based landline and wireless communication systems covering, for example, a land area delineation 1799. The communication systems are coupled with the Internet and so denoted as open cloud based systems, 1702, 1704, 1706, 1708, 1710, 1712, and 1714. In the example, land area is divided into hexagonal shaped areas for more generic illustration purposes. In the example, Spime™ system 1702 covers communications across a first geographical area, A, and so on, as depicted in FIG. 17.

For example, using another embodiment of a commercial unmanned aircraft-package-delivery-service Spime™ object, object 1750, stored at host 1760, is a flight-path-controller object of a commercial unmanned aircraft delivery system apparatus 1740. Instructions stored by Spime™ object 1750 include instructions that negotiate the commercial unmanned aircraft communications pathway from package origination source area A to package delivery target area G. The flight path may be negotiated to optimize for a particular path criteria such as, for example, avoiding collisions with other commercial unmanned aircrafts 1792, 1994. Another example of a path criteria includes finding a fastest route or a least expensive route, or route controlled by an entity, or a route meeting a particular user requested criteria or artificial intelligence determined or controlled criteria.

Flight-path-controller Spime™ object 1750 operates in conjunction with land-based flight-path-assistant Spime™ object 1712. For example, flight-path-assistant Spime™ object 1712 can store local information related to what airspace other commercial unmanned aircrafts are in or expected to be and if the other commercial unmanned aircrafts are in the same air space or expected to be in the same air space at the same time as commercial unmanned aircraft system apparatus 1740. Flight-path-assistant Spime™ object 1712 can also store local area air space information, such as weather information, current or expected rain or snow, wind, temperature, solar energy. Local air space information is used to assist the commercial unmanned aircraft-package-delivery-service Spime™ object 1750 to control the flight path of the commercial unmanned aircraft 1740.

Commercial unmanned aircraft-package-delivery-service Spime™ object 1750 needs to be in constant communications with flight-path-assistant Spime™ object 1712. Flight-path-assistant Spime™ object 1750 needs to be in constant communication with access points of the neighboring communication systems. Access points to the neighboring systems 1702, 1704, 1706, 1708, 1710, 1712, 1714 for each has a respective object 1712, 1714, 1716, 1718, 1720, 1722, 1724, hosted by each individual respective Spime™ host device 1722, 1724, 1726, 1728, 1732, 1734.

Communication systems 1702, 1704, 1706, 1708, 1710, 1712, 1714 provide wireless communications for commercial unmanned aircrafts, e.g. commercial unmanned aircraft 1740 while traveling across a land area. Commercial unmanned aircraft 1740 is to travel between source location A and target location G. Each system used to execute a flight path across the land area has an associated communication speed including an available throughput rate. Commercial unmanned aircraft-package-delivery-service Spime™ object 1750 needs to maintain communication at a minimum throughput rate as it travels across each region that falls under communication coverage of the combined different communication systems.

As commercial unmanned aircraft-package-delivery-service Spime™ object 1750 travels, it executes, alone or as part of an embodiment of a self-determination apparatus 204 or host device 206 (1760), an embodiment of the process illustrated in FIG. 11. For example, Spime™ object 1712 determines one or more of a minimum capability parameter, wherein a minimum capability parameter includes a physical capability requirement of a minimum guaranteed continuous communication speed (1102) between itself and Spime™ object 1750. In another embodiment, an additional capability parameter can be used in conjunction with minimum guaranteed continuous communication speed capability parameter. For example, the capability parameter of having a matching geographic direction (within a specified degree range, e.g., within 30 degrees of a specified direction e.g., of a two-dimensional 360 degree plane) can be used to evaluate the received potential target messages.

For example, a minimum communication speed can be a minimum communication throughput. Spime™ object 1712 generates (1104) a Spime™ announcement message 400 embodiment including its ID 402, message type 404, service type 406, and a criteria of interest 410 including an indication of a minimum communication throughput required for a flight-path-assistant Spime™ object to communication with the commercial unmanned aircraft 1740. The Spime™ announcement message is received by one or more systems within the future expected communication range (e.g., neighboring communications systems or systems detected by the object) of the commercial unmanned aircraft headed to the target location area G. For example, systems located at or near the start of the delivery path area A can be system 1704 and 1706.

In the embodiment, Spime™ object 1714 and object 1716 each receive the announcement message and determine whether they have enough resources to meet the criteria of interest 410. If they do, then each object responds with its respective Spime™ announcement message 400 or Spime™ available agent announcement message 500 including an indication of how much throughput it can provide. For example, Spime™ object 1714 checks that it has over the minimum throughput requirement criteria (e.g., 10 Mbits/sec downlink and 5 Mbits/sec uplink) and indicates it has 14.7 Mbits/sec downlink and 5.75 Mbits/sec uplink. Spime™ object 1716 indicates is has 28 Mbits/sec downlink and 22 Mbits/sec uplink. Spime™ object 1712 receives the respective responding message from Spime™ object 1714 and 1716 (1106). In this embodiment, block 1106 of process 1100 includes determining which responding object met the criteria best and compares the best response with its criteria (1108). Spime™ object 1712 determines if criteria for migration of itself to another host is met (1110) and if yes initiates a migration process (1112) of object 1712 to a target Spime™ host device, e.g., 1726.

This process repeats with Spime™ object 1712 moving from Spime™ host to Spime™ host, e.g., Spime™ host 1726 to Spime™ host 1728 to host 1732 until it reaches Spime™ host 1734, assuming all had met the criteria throughout the execution of embodiments of process 1100 by Spime™ object 1714 for each of the Spime™ hosts encountered along the way to the target destination area.

Embodiments of the invention described herein enable the internet of things (IoT) technology to expand beyond any of its current conventional implementations. Spime™ objects designed in accordance with some embodiments described herein can be applied to other commercial applications and to some military applications. Spime™ objects designed in accordance with some embodiments described herein enable a scalability technique of systems using IoT technology to have greater system availability and less failure. Spime™ objects designed in accordance with some embodiments described herein enable a system of like distributed sensors to scale automatically. Spime™ objects designed in accordance with some embodiments described herein enable a distributed system of software modules to communicate and grow to include artificial intelligence more seamlessly or in a controlled research setting while not affecting existing use of a system. Advanced distributed sensor networks and systems could scale seamlessly by including one or more embodiments described herein. Spime™ objects designed in accordance with some embodiments described herein enable improved data processing and cybersecurity protections. Spime™ objects designed in accordance with some embodiments described herein enable cybersecurity across distributed networks to scale seamlessly and to be maintained automatically. Spime™ objects designed in accordance with some embodiments described herein enable artificial intelligence to be implemented in a more seamless way into an existing network. Spime™ objects designed in accordance with some embodiments described herein describe a computational architecture for next generation machine learning. Spime™ objects designed in accordance with some embodiments described herein enable more energy efficient computing. Spime™ objects designed in accordance with some embodiments described herein enable signal processing that reduces hardware requirements. Spime™ objects designed in accordance with some embodiments described herein enable greater assurance, reliability and validation techniques. Spime™ objects designed in accordance with some embodiments described herein enable heterogeneous integration. Spime™ objects designed in accordance with some embodiments described herein enable microsystem design and computer aided design (CAD). Spime™ objects designed in accordance with some embodiments described herein enable systems of microsystems to scale and grow in an automatic method. Spime™ objects designed in accordance with some embodiments described herein enable systems of microsystems including sensor or actuation devices to scale and grow using an automatic process including a process using artificial intelligence.

What is claimed is:

1. A Spime™ self-determination apparatus comprising:
a Spime™ object including computer-readable instructions that, when executed by a processor, cause the processor to:
execute a portion of a service which is part of at least one service provided by a system including a distributed computing platform,
determine its own Spime™ object capability parameters, and
store information about at least one target Spime™ host device;
Spime™ announcement circuitry configured to:
generate an announcement message reporting presence of a Spime™ service type and the Spime™ object capability parameters;
Spime™ host evaluator circuitry configured to:
receive information from other Spime™ announcement messages,
evaluate current host device capability parameters with respect to the Spime™ object capability parameters,
determine when the current host device capability parameters meet a criterion, and
initiate a migration request message from the Spime™ object, for migration of the Spime™ object, the object including software code and processing instructions and service function instructions, the migration to a target Spime™ object host device, when potential target host device capability parameters meet a criterion; and
Spime™ migration circuitry configured to manage the migration of the Spime™ object to the target Spime™ host device.

2. The Spime™ self-determination apparatus of claim 1, wherein the current capability parameters include physical current capability parameters including any one of: processing speed, memory, SRAM, processing performance, instructions per cycle, floating-point operations per potential transfer host, computing capacity, computing load maximum per requested process, internal storage capacity, number of CPUs cache memory, different level cache memory including second level cache, main memory, hard drive capacity, memory bandwidth, input/output bandwidth, communications bandwidth, communications throughput, memory controller parameters, or remote associated storage capacity, or any combination including one or more of the physical current capability parameters.

3. The Spime™ self-determination apparatus of claim 1, wherein the Spime™ object includes instructions of an artificial intelligence procedure configured to generate new processing functionality and instructions, which are configured to require an update to its current capability parameters.

4. The Spime™ self-determination apparatus of claim 1, wherein the Spime™ object includes instructions configured to monitor and update its current capability parameters.

5. The Spime™ self-determination apparatus of claim 1, wherein the Spime™ object includes instructions configured to monitor and update its memory requirements.

6. The Spime™ self-determination apparatus of claim 1, wherein the Spime™ object includes instructions configured to monitor and update its processing performance requirements.

7. The Spime™ self-determination apparatus of claim 1, wherein the current capability parameters include logical current capability parameters including any one of: data security type, security level, security cost limit, legal jurisdiction, privacy selection, advertiser selection, economic requirement, financial requirement, energy efficiency, energy cost, energy source, energy use, operation cost, relative trust, geographic location, ownership, communications cost limit, or availability, or a logical capability parameter associated with a particular service capability, or any combination including one or more of the logical current capability parameters.

8. The Spime™ self-determination apparatus of claim 1, wherein the Spime™ host evaluator circuitry receives a Spime™ announcement message from an available agent Spime™ host device.

9. The Spime™ self-determination apparatus of claim 1, wherein the Spime™ host evaluator circuitry receives a Spime™ announcement message from a Spime™ production apparatus,
wherein the Spime™ host evaluator circuitry determines, when no available target host device exists, to generate a new resource request message including instructions to produce a 3-dimensional model in accordance with a design specification.

10. A method comprising:
executing a portion of a service which is part of at least one service provided by a system including a distributed computing platform;
determining object capability parameters required to perform the executing;
storing information about at least one target host device;
generating an announcement message reporting presence of a service type and the object capability parameters;
receiving information from other announcement messages;
evaluating current host device capability parameters with respect to the object capability parameters;
determining when the current host device capability parameters meet a criterion;
initiating a migration request message from the object, for migration of the object, the object including software code and processing instructions and service function instructions, the migration to a target object host device, when potential target host device capability parameters meet a criterion;
managing the migration of the object to the target host device;
receiving an announcement message from a production apparatus; and
determining when no available target host device exists, to generate a new resource request message including instructions to produce a 3-dimensional model in accordance with a design specification.

11. A Spime™ self-determination apparatus comprising:
a Spime™ object including
instructions to execute a portion of a service which is part of at least one service provided by a system including a distributed computing platform,
instructions to determine its own Spime™ object capability parameters, and
instructions to store information about at least one target Spime™ host device;
a Spime™ announcement module to generate an announcement message reporting presence of a Spime™ service type and the Spime™ object capability parameters;
a Spime™ host evaluator module:
to receive information from other Spime™ announcement messages,
to evaluate current host device capability parameters with respect to the Spime™ object capability parameters,
to determine when the current host device capability parameters meet a criterion, and
to initiate a migration request message from the Spime™ object, for migration of the Spime™ object, the object including software code and processing instructions and service function instructions, the migration to a target Spime™ object host device, when potential target host device capability parameters meet a criterion; and
a Spime™ migration module to manage the migration of the Spime™ object to the target Spime™ host device.

12. The Spime™ self-determination apparatus of claim 1, wherein the current capability parameters includes a memory parameter and the potential target host device capability parameters includes a memory parameter.

13. The Spime™ self-determination apparatus of claim 12, wherein the current capability parameters includes a memory parameter and the potential target host device capability parameters includes a memory parameter.

* * * * *